United States Patent
McNally

(10) Patent No.: US 12,222,521 B1
(45) Date of Patent: Feb. 11, 2025

(54) ADAPTABLE COMPUTING NETWORK WITH REAL TIME, INTELLIGENT, 4D SPHERICAL SCALABILITY, TECH STACK AWARENESS, TECH STACK INTEGRATION, AUTOMATIC BI-DIRECTIONAL COMMUNICATIONS CHANNEL SWITCHING AND ORDER EQUILIBRIUM—FOR LARGE ENTERPRISE, TIME SENSITIVE EVENT/TRANSACTION DRIVEN APPLICATIONS

(71) Applicant: Ameranth, Inc., San Diego, CA (US)

(72) Inventor: Keith R. McNally, San Diego, CA (US)

(73) Assignee: Ameranth, Inc., San Diego, CA (US)

( * ) Notice: Subject to any disclaimer, the term of this patent is extended or adjusted under 35 U.S.C. 154(b) by 0 days.

(21) Appl. No.: 18/647,577

(22) Filed: Apr. 26, 2024

Related U.S. Application Data

(63) Continuation of application No. 18/363,276, filed on Aug. 1, 2023, now Pat. No. 11,985,039, which is a continuation of application No. 18/183,663, filed on Mar. 14, 2023, now Pat. No. 11,770,304.

(51) Int. Cl.
| | | |
|---|---|---|
| *G02B 27/28* | (2006.01) | |
| *H01S 3/04* | (2006.01) | |
| *H01S 3/225* | (2006.01) | |
| *H01S 3/23* | (2006.01) | |

(52) U.S. Cl.
CPC ............ *G02B 27/28* (2013.01); *H01S 3/0401* (2013.01); *H01S 3/2251* (2013.01); *H01S 3/2256* (2013.01); *H01S 3/23* (2013.01)

(58) Field of Classification Search
CPC ......... G06F 9/547; G06Q 30/01; H04L 41/14; H04L 49/20
See application file for complete search history.

(56) References Cited

U.S. PATENT DOCUMENTS

| | | | | |
|---|---|---|---|---|
| 2008/0142581 A1* | 6/2008 | Roebke | .................. | G07F 17/40 |
| | | | | 235/375 |
| 2015/0119033 A1* | 4/2015 | Maria | .................. | H04W 48/18 |
| | | | | 455/435.2 |
| 2017/0287086 A1* | 10/2017 | Lopez | .................... | G06Q 50/12 |

* cited by examiner

*Primary Examiner* — Gil H. Lee
(74) *Attorney, Agent, or Firm* — John L. Rogitz; John M. Rogitz

(57) ABSTRACT

Systems, methods, software and a framework are disclosed for an improved, adaptable, intelligent, real time, machine learning, AI/Robot integrated, large scale, cloud computing based synchronous communications/computing network enabled with adaptive intelligent '4D spherical scaling' of databases, servers, and/or virtual servers and/or server clusters and elastically with their directly associated computer caches/storage and linked and 'intra-scalable microservices' and with external resources and with 'tech stack awareness', and 'tech stack integration' functionality.

30 Claims, 5 Drawing Sheets

ADAPTABLE COMPUTING NETWORK WITH REAL TIME, INTELLIGENT, 4D SPHERICAL SCALABILITY, TECH STACK AWARENESS, TECH STACK INTEGRATION, AUTOMATIC BI-DIRECTIONAL COMMUNICATIONS CHANNEL SWITCHING AND ORDER EQUILIBRIUM—FOR LARGE ENTERPRISE, TIME SENSITIVE EVENT/TRANSACTION DRIVEN APPLICATIONS

FIELD

Large, scalable, cloud computing based, real time, machine learning, event driven adaptable computing network systems with omni-channel communications/computing networks, a framework and deep personalization functionality via e.g. 'tech stack awareness', 'tech stack integration' and AI capable positioning/integration for/with a large multiplicity of consumers performing wireless/web transactions and for exemplary embodiments in the Hospitality Market; including e.g. four market segments e.g. 'food/drink ordering', 'restaurant reservations', 'hotel/rental reservations', and 'event ticketing' and each operating with a variety of different wireless handheld computers used by consumers and/or staff and all of which may be seamlessly and deeply integrated, with digital frequency and/or reward solutions.

BACKGROUND

Since the commencement of the $21^{st}$ Century, transformational and revolutionary changes/advancements have occurred across the entire spectrum of computing, communications, social media and consumer behavior/preferences in the hospitality market as well, (albeit only more recently as to consumer behavior which was vastly accelerated by the impact of and implications from the COVID 19 Pandemic). In parallel and with this ever increasing force/momentum, AI and robotics advancements have been accelerating in impact too and now it is possible, e.g. for a consumer order to be placed by an AI agent, accepted by an AI agent, produced robotically, and delivered by AI powered delivery vehicles, robots and/or drones that also can communicate with the consumer, via e.g. AI generated voices and/or chat messages, and thus with the entire order processed, made and delivered automatically and/or alternatively with only some of these elements/steps occurring via AI based elements. These paradigm changes have impacted and manifested ever growing computing and communications network needs/challenges, and developing and maintaining the network and integrations for these emerging challenges is most challenging in the high volume, ultra time sensitive, transactional based markets and especially with the exemplary embodiments in the Hospitality Market Applications, including e.g. four of which this disclosure provides exemplary and specific solutions to their specific technical problems/needs in these four exemplary embodiments; yet the inventive concepts disclosed herein are much more broadly applicable.

As this century began, a 56KBPS physical modem, was the norm and was largely 'state of the art' for most consumers accessing the internet, and HSIA, even for businesses was almost unheard of, and then only a tiny, tiny fraction of today's speeds, while very expensive and many businesses still relied upon periodic 'batch processing' after hours to even attempt data synchronizations across networks/locations. 1G Cellular networks were similarly slow, and again, very expensive to use, mobile web browsers were unavailable, and 802.11 was barely emerging and 'Wi-Fi' had not yet even become a commonly understood term. A 1 MB memory in a PDA was seen as a luxury and 'mass data storage' of those times, would now fit on thumb drives of 2023. Cloud Computing was largely a 'geeky concept' that few could even imagine, and even fewer understand. Facebook didn't even exist, yet it now has the previously unimaginable number of billions of members and it is a major force and market power as are other such social media providers that must now be considered and integrated with—by any $21^{st}$ Century business and any computing network. Google was barely 'coming to life' and Apple was still 'fighting for its life in 1999 and few could have then imagined their virtual mobility duopoly of today—with worldwide dominance across billions of connected mobile devices, which Google never imagined at the time and which Apple had previously failed terribly in pursuing, in the earlier 1990s. While, they were most surely unanticipated victors/giants of mobility for the century ahead, they are now just that; whereas Microsoft, the undisputed computing/software king at the turn of this century lost out on its expected dominance in the mobility/wireless market. Yet, today, this mobility duopoly and its walled garden positioning is being challenged. Leveraging these technical advancements, and overcoming the obsolescence of prior frequency/loyalty solutions, a new era in deep frequency/loyalty solutions is also needed and now provided herein.

Today, resulting from these multi-faceted, parallel, and interrelated multi-dimensional paradigm technology shifts, and the inexorable forward advancements of Moore's Law, (albeit only now starting to slow due to the physical barriers of physics) megabytes became gigabytes then terabytes then petabytes—(and which is not seen as abnormal in 2023) and exabyte memory needs/uses are now emerging. Storing, accessing, and analyzing such vast amounts of data, is a monumental task, demanding ever faster and better techniques, and more intelligent solutions, services and/or methods. Similar and proportional advancements have occurred in the last 20+ years in almost all aspect of computing, and communications e.g. 5 g Wireless WAN's, HTML5, 802.11ax (WiFi-6), IPv6, 1 GBPS downloads etc. along with accelerating advancements in artificial intelligence and its subfield of 'machine intelligence'.

Amazon revolutionized web/internet ordering, and it has recently moved beyond merely 'fast' delivery to 'same day' deliveries and now even 'within the hour' deliveries and consequently many physical stores/businesses have been adversely impacted and/or in some instances obsoleted to various degrees. However, there remains, no technical challenges greater than in the event/transaction driven, hospitality market, and especially in dealing with e.g. the complexities of customized food ordering and/or having to deal with an instantaneous peak demand for e.g. Taylor Swift concert tickets, the moment that they become available and/or peak restaurant and/or hotel reservations for holidays and special events/occasions. While Amazon, is extraordinarily impressive in and of itself, even Amazon, doesn't 'custom produce' their individualized products, and usually, multiple different customized products in the same order in the form of very perishable food/drink orders, unique to each customers specific needs/requests, and coordinate their delivery in less than an hour, and when late, cold and/or soggy products, often result in the total loss of the order's contents/value and many times also resulting in permanent customer dissatisfaction, when e.g. the food is tasteless or spoiled. It's an unforgiving and uncompromising business challenge and even more so at scale and at ultrascale. And now in 2023, even Starbucks, (with its very highly perishable coffee products) is entering this delivery market in a big way and with its even more demanding timelines and quality expectations.

However, none of the remarkable technical advancements since the start of the $21^{st}$ Century, and/or new business processes, would have become truly impactful, without concomitant changes in consumer behavior and overcoming the inertia and resistance to change, (at least in some demographic groups) especially in/by older generations. However, the Covid 19 Pandemic catapulted and accelerated even the baby boom generation 'couch potatoes' of today e.g. many Grandparents from the 20th Century into the 21st Century of technology, to now become 'smart phone' ordering 'enthusiast's at first and slowly but steadily, 'experts' too—even if they haven't yet quite realized it. When grandparents, e.g. have their own social media accounts, multiple email accounts, smart phones, home WIFI Networks, multiple downloaded mobile apps, dozens of passwords to remember and more, they have 'arrived' in 'the digital age'. We have also become an ever increasing digitized, cashless and 'I want it and delivered to me now and at my home' society. And the exemplary grandparent at least knows how to 'order their favorites'; if their children or grandchildren have helped them 'set up' their smart phones to order them. And the newer millennial and Gen Z generations were virtually 'born into' the $21^{st}$ Century digitized age. Thus demand for these services have soared in recent years and are likely to remain elevated, if not accelerate further. Further, prior to recent technology advancements, restaurants were mostly a physical place, where consumers went to dine and obtain their food and the vest majority of revenue for restaurants, except for the pizza business have long relied on revenue from on site customers. Yet now, the demand for omnichannel communications/integrations is insatiable, to include allowing consumer ordering from an ever increasing array of ordering options, devices and distribution points and beyond merely enhancing revenues—business survival depends on the ability of a restaurants and/or hotels/venues to know and track their customers, and attract, and execute remote orders and to deliver them from multi faceted delivery options, flexibly, easily and efficiently. Further and in an unexpected consequence from and reaction to the unprecedented expansion of remote ordering and competition for delivery drivers, (outside of pizza chains), some pizza chains and/or restaurants are now promoting 'pick up' orders in lieu of deliveries and some have outsourced their deliveries to the newly emerging order aggregators. The previously segregated sectors of restaurants/retail/grocery are also blurring. Even entirely 'virtual restaurants' have emerged, in which there are no 'on site' sales, rather only 'ghost kitchens' and/or only remote delivery and/or take out is available via 'hub and spoke' like operations. And these paradigm business shifts have created the need for better/greater and deeper consumer frequency/loyalty integrations including e.g. subscription services, which require new technical approaches via the new disclosures herein.

Emerging to meet these operational challenges, throughout the highly time sensitive transaction based Hospitality Market and especially in the food/delivery space are new technologists, new services and e.g. "order aggregators" (a term, adopted and used in this disclosure) and an embodiment of the new inventive concepts disclosed herein. These 'order aggregators' set/establish and because of their breadth and scale, with ever increasing market power, the standards/rules, to operate within their networks., As these newer 'order aggregators' have emerged there have been growing pains and technical and operations issues/shortfalls though, in the scaling and optimization of their technology/services. They have not as of yet fully recognized the need to ascertain, assess maintain and fully integrate "tech stack" information (a term, adopted, defined and used specifically/uniquely in this disclosure), planned for the seamless integration of/with AI solutions and their overall systemic approaches have been limited which have resulted in similar operational challenges and adverse impacts on their linked/integrated participants e.g. 'ordering consumers', (another term, adopted and used in this disclosure) e.g. partner restaurants, hotels, and/or venues and where appropriate/needed with their 'order deliverers' (another term, adopted and used in this disclosure) networks' too. A well known example, of what can occur if a network is not designed for and resilient to rapid changes in loads was shown in the movie 'The Social Network', when Mark Zuckerberg (Facebook founder), crashed the Harvard.Edu network in one night when usage of his early version of Facebook soared. While only a few years ago, most restaurant owners/managers couldn't even explain what a 'tech stack' was/is, yet today it's not uncommon for a new restaurant owner/manager to be more focused on their 'tech stack' than their chef. And while most consumers don't know what a 'tech stack', is' they too have one, whether they recognize it or not. Now, even grandparents, (although mostly unknowingly), have their own 'tech stack' e.g. one or more iPhones, with multiple mobile apps, e.g. for both individual restaurants and delivery aggregator apps downloaded and stored along with a reservations/ticketing aggregator app, Apple Pay and/or credit cards set up/stored, security/GPS settings, chat links, multiple passwords, multiple emails and most linked to frequent customer/points accounts and including catering and subscription services, and Bluetooth synced with their iWatch and/or their autos, and all interconnected with their home Wi-Fi network and both to their wireless 5G Networks, and a wired HSIA network in parallel. Further, it is becoming necessary for full integration, with the newly emerging AI based solutions, to include e.g. robotic deliveries, and other AI based solutions e.g. Chat GPT type solutions/options/services, acting on behalf of consumers, for all four exemplary hospitality market segments, and the adaptable framework disclosed herein positions all embodiments for full integration with these new channels/options while maintaining integration and consistency with the prior and independent consumer ordering channels. Just learning and knowing, exactly 'whom' or 'what' is placing the order, and 'for whom', will become an ever increasing challenge/need and one disclosed here, via the 'tech stack awareness' and "tech stack integration' functionality.

Adapting and scaling to meet these ever increasing and complex demands will become ever more challenging ahead. The conventional prior solutions, were/are difficult to visualize and update, maintain, integrate and scale and they were/are limited in large part because they have become so complex and interdependent, that few within any of the organizations charged with developing and maintaining them fully understand them sufficiently to optimally resolve their current limitations, while planning for the future growth needs. Scalability has been extremely constrained, costly, non efficient, inflexible and non-responsive in many instances.

This disclosure and its teachings present new advancements and new ordered combinations of existing elements while integrating them in different and better ways, while also adding multiple entirely new concepts, new integrations, new and deeper synchronizations and uniquely converging them in ways not previously done and/or as deeply integrated/synchronized as is now possible with the disclosures of these inventive concepts/teachings. The newly introduced and disclosed herein concept/terms of e.g. recognizing 'operational state', knowing and recognizing the full 'consumer tech stacks', systemic 'tech stack awareness', 'tech stack integration' 'Intelligent 4D spherical scaling' and other new terms/concepts all integrated into a new and adaptable framework are integral, (in part and/or in combination) to solving the problems/limitations of today, while further positioning the solutions for growth and supportability for the emerging needs, including AI integrations ahead. These new approaches and the framework disclosed herein enable a POSA to architect, design, and solve the unique computing/network specific technical limitations/problems of the prior, conventional approaches/systems and technology and empower new and improved, adaptable network architectures/frameworks well into the 21$^{st}$ Century ahead as is explained and disclosed below. This disclosure provides a new, unified and adaptable network and framework with multiple new solutions, advancements and new ordered combination integrations which include e.g. defining the problems in new and revelatory ways, to solve the specific technical problems above and the further defined specific and unique technical/network problems below, for the four exemplary embodiments, identified herein, yet again, the teachings/disclosures herein are much more broadly applicable.

SUMMARY

Multiple but non limiting embodiments are disclosed herein that provide systems and methods and an adaptable computing framework with Microservices and/or Hybrid Microservices for "Order Aggregators" to intelligently evolve/advance, scale/adapt, integrate and synchronize their systems/products/services with linked and/or partnered "Order Providers", "Ordering Consumers", and "Ordering Deliverers"—and to meet the ever growing need for seamless external and internal, API based integrations while accommodating unprecedented growth and vastly temporal and variable system/transactional loads/requirements. The inventive concepts herein, teach and enable a convergence of previously disparate functions, features and services into a synchronized, integrated, new and intelligent ordered combination yielding strong consistency, while minimizing network latency. Multi-faceted/channel delivery options are disclosed herein to include e.g. private, one or more aggregators, one or more white label aggregators, one or more chains, and/or combinations of all as well as with a multiplicity of 'order providers'. Sharing of customer/consumer information, including e.g. all real time consumer 'tech stack' data/information across/with the various linked elements is disclosed. The integrated solution(s) address both expected and unexpected computing/storage demands/needs, and then while seamlessly and concomitantly considering/applying all relevant time related factors for the disclosed intelligent 4D scaling functionality. The new intelligent 4D Spherical Scaling approach and framework disclosed herein defines, addresses and solves the prior scaling and integration problems, in a new and revelatory way, leading to greatly improved solutions. The systems, methods and framework disclosed herein provide an improved, real time, machine learning, temporal, large scale, cloud and Microservices based computing and synchronous communications network—enabled with adaptive 'intelligent 4D spherical scaling' of databases, servers, and/or virtual servers and/or server clusters and elastically with their directly associated computer caches/storage and with/to their linked and 'intra-scalable microservices' for these four exemplary embodiments within the hospitality market segments. The new 'tech stack awareness' functionality as defined below and application of the 'tech stack' terminology and understanding to/with the other elements of the connected/integrated solution and for the first time designating and including the 'consumer tech stack', enables deeper and improved integrations and concurrent expanded frequency/rewards functionality with consumers, which were and are unavailable in any prior solutions. Their use is optional, and dependent on the embodiments.

This disclosure and its teachings present new advancements and new ordered combinations of elements while integrating them in different and better ways, adding entirely new concepts, new integrations, new synchronizations and uniquely converging them in ways not previously done and/or as deeply integrated/synchronized as is now possible with the disclosures of these inventive concepts/teachings. The newly introduced and disclosed herein concept/terms of recognizing 'operational state', learning and then knowing the full 'consumer tech stacks', 'tech stack awareness', 'intelligent 4D Spherical scaling' and other new terms/concepts address, alone and/or in ordered combinations solve the problems/limitations of today, while also positioning the solutions for growth and supportability for the rest of the century ahead. These new and adaptable approaches and frameworks enable a POSA to architect, design, and solve the unique computing/network specific limitations/problems of the prior, conventional approaches/systems and technology and empower new and improved network architectures/frameworks well into the 21$^{st}$ Century ahead to include positioning for the emerging implications of/from AI based services as is explained and disclosed below. This disclosure provides a new and unified adaptable network and framework and which may include cloud based solutions and new ordered combination integrations to/for the specific technical problems above and as to the further defined specific and unique technical/network problems below, for the four exemplary embodiments e.g. for the identified hospitality market segments. Yet the applicability is greater than these exemplary embodiments.

The disclosed embodiments are exemplary with their applicability broader, and each with a wide range of additional features/options/embodiments and varying external integrations which persons of skill in the art would understand are adaptable and flexible in a wide number of embodiments as is required for unique needs allow for optionally 'plugging into and out of,' the network i.e. as disclosed herein their 'operational state', and integrated with the frameworks/networks disclosed. As described herein these embodiments and this new technical functionality are further illuminated and discussed/explained below, including their use as part of ordered combinations of the terms/elements defined in the glossary of terms below and as are shown e.g. integrated together, in whole and/or in part in exemplary FIGS. 1-5, and as is further explained in detail below. FIGS. 1-4 and their specific elements and sequences provide flow charts, of the actions/events that occur prior to and then in real time, at the exemplary moment of Mar. 18, 2023, at 11:30:01:01 and then the events that occur in the exemplary hour time period, of the exemplary order, as is shown in FIG. 5. The steps/actions, as shown throughout these figures and as are explained and illuminated with the specification disclosures specifically explaining/teaching the steps/interactions, provide architectural, framework and programming guidance to a POSA to create, establish, maintain, test and then optimize the adaptable computing network and framework disclosed herein.

Glossary of New Terms

The Glossary immediately below defines numerous new terms and concepts introduced herein and which are the building blocks of the new solutions and which are used throughout this disclosure to ensure uniformity and consistency of the disclosed inventive systemic concepts and to avoid repetitive explanations throughout the detailed description which follows. These terms should be viewed, concomitantly with the enclosed figures that follow and which, further illuminate their meanings and interrelationships to persons of skill in the art (POSA). These specifically defined terms are intended to be 'lexicographer definitions'; yet they too are still to be understood along with the other commonly understood terms used throughout the disclosures to include their full scope as viewed through the lens of a POSA, and how they would understand their meanings both alone and as part of ordered combinations in respect to the varying embodiments. As is stated above, these embodiments are merely exemplary, and non limiting and the scope and applicability of many of the new, inventive concepts are much broader.

"Transaction Based Hospitality Markets": Exemplary Hospitality Market 'Ordering' segments include e.g.: (1) food/drink for delivery/take out/pick up/drive thru, (2) restaurant reservations, (3) hotel/rental reservations and (4) event ticketing. Each and/or all may optionally be integrated with one or more frequency/reward programs". Some can be integrated together and/or include multi functions. In addition to their own on premise computing equipment, the respective order aggregators, chains, and/or providers, may utilize and control the respective cloud based computers, web servers, virtual web servers, clusters of the same and their associated storage functionality supporting their services, including everything within their respective 'tech stacks' just as if that was located at their own on premise locations and/owned by them and any combinations of on and off premise equipment/services.

"Order Aggregators': 'Entities that aggregate, coordinate and execute Large Quantities of Hospitality Orders for ordering consumers from Multiple Order Providers and/or and also including e.g. third party computing/software entities that integrate/interact, via their own and/or the aggregator API's/interfaces with these aggregators, and to include e.g. their interfaces with ordering consumers and/or 'order providers', irrespective of whether they perform all functions/and/or complete the transactions.

"Order Providers": 'Entities providing and/or fulfilling orders with one or more physical and/or virtual locations. Chains are usually both 'providers' and 'aggregators' themselves and may also integrate with other aggregators.

"Ordering Consumers": 'Customers that order from one or more 'Order Providers' and/or 'Order Aggregators'.

"Order Deliverers"; 'Mobile Staff, contractors and/or mobile robots that deliver Hospitality Orders to Ordering Consumers'

"Tech stacks": 'A tech stack is the combination of all real time and non real time computing/communications technologies, e.g. servers, web servers, virtual servers, devices etc. passwords/security and computing/software tools/services and data used respectively in accordance to their unique needs by order aggregators, providers, deliverers and consumers.' These are exemplarily shown, (in the figures) e.g. as 'spheres', (since that provides a better visualization of them respectively), e.g. akin to a 'sphere of influence', to include e.g. the respective PAN, LAN, WAN communications networks. Further, and uniquely, in accordance with the inventive disclosures herein, tech stacks, include non real time and real time personal, social media, operational and business information, and including e.g. operational status and menus/reservations/tickets etc. and optionally geolocations of staff, contractors and/or consumers when appropriate and authorized.

"Order Aggregators Tech Stacks': The real time and non real time procedures and computing/communications technologies and e.g. servers, web servers, clusters, a central data platform, aggregator application software etc. and data used in combination to design, program, build, test, deploy and operate a hospitality aggregator ordering application/service and as is shown e.g. in FIGS. 1-5 and further explained herein. The tech stack may include e.g. some or all of DEVOPS, programming languages, frameworks, databases, data warehouses, data lakes, streaming communications, message brokers, computers/servers, wireless computing devices/handhelds, front-end tools, back-end tools, machine intelligence, AI robots and the like, interfaces to/with AI agents, rules/standards and connections with other applications and externals, inter and intra datacenter and cloud service communications, QR codes, Geo locations, and even other aggregators at time via multi-faceted, rules APIs and/or API Arrays/Facades/Gateways. Other companies providing a majority of the 'order aggregator'. Staff and/or managers e.g. integrated smart phones/tablets, for reporting/analysis, and other such functions are also included along with their own personal tech stacks, and when appropriate/authorized to include their geolocations. Order aggregators seek to and are expected to be operationally, 365×7×24 and as such are considered to be always 'operationally stateful', but in the rare instances, when their networks do go down, they revert to being 'operationally stateless' for those usually very brief periods. Order aggregator tech stack information/data are primarily made available externally through its API's and/or related rules/standards.

"Temporal 4D Scaled Intranet": The actual computing/storage/communications resources, services and/or data used by an 'Order Aggregator' from within its overall 'tech stack' at any given moment in time to provide its own services as of that moment. Again, 'Chains' are often/usually 'Order Aggregators' themselves for their own dedicated/linked consumers in addition to optionally partnering with external, third party 'Order Aggregators'.

"Order Providers Tech Stacks": 'The computing/communications technologies may include their 'operational state' and e.g. password/securities/tools/interfaces and servers/computers and devices used by the respective 'order providers' for their particular needs including e.g. API's and POS/PMS/Box Office systems, QR codes, staff/server/manager wireless handheld computing devices, PAN's, LAN's and WAN's, and e.g. all of their respective internal/external data/information and integrations, e.g. menus and menu management, web site, payment processing, frequency and social media integrations, web sites, social media presence and interfaces. Staff and/or managers e.g. integrated smart phones/tablets, for reporting/analysis, and other such functions are also included along with their own personal tech stacks, and when appropriate/authorized to include their geolocations.

"Ordering Consumers Tech Stack": 'The computing/communications technologies used by consumers and their personal and real time information which may include, e.g. their 'operational state', geolocations and e.g. one or more iPhones/Android Smart Phones/tablets, e.g. iWatch, wearable computers and/or other such wearable devices and with one or multiple mobile apps, (app store or non app store based) e.g. for both individual restaurants and different delivery aggregator apps downloaded and/or stored along with a reservations/ticketing aggregator app, Apple Pay, Google Pay and/or credit cards set up/stored, security/GPS settings, chat links, multiple passwords, multiple emails and most linked to frequent customer/points accounts, birthdays/anniversaries, reservation histories, email addresses, cell numbers—social media accounts e.g. Facebook—Instagram—Twitter—and Bluetooth synced with their iPads and/or iWatch and/or their autos, and all interconnected with their home Wi-Fi network and both to their wireless 5G Networks, and a wired HSIA network in parallel. Additionally, their biometric, personal data/characteristics are optionally part of one's tech stack too. Further though the 'consumers tech stack' is not fixed/static, since they might take some of it, with them to locations, other than their homes, and their geolocations, often changing are included as well. Some or all of this information may be known and/or used by the consumer and/or other parties/devices/services; dependent on the current known information and/or the particular task/need. One's tech stack also may include their MAC addresses as to their various devices components; a MAC address (media access control address) is a 12-digit hexadecimal number assigned to each device connected to the network. Software frameworks/structure, and guidance to a POSA to include the functionality to enable software for a POSA to develop, accomplish, integrate maintain, update and provide an integrated solution for/of the consumer's tech stack and its interactions with and exploiting/interactions with e.g. AI agents and/or services are disclosed and may be optionally provided and enabled herein for a POSA—yet it is entirely optional and is not required.

"Order Deliverers Tech Stacks": 'The computing/communications technologies used by delivery persons and/or delivery robots which may include their 'operational state' for individual and/or group/catering orders, may include e.g. one or more computers and/or smart phones (and their MAC addresses), with one or more 'Order providers' and/or 'order aggregator' mobile apps, integrated with and operable from and/or downloaded to their one or more devices, along with e.g. their Bluetooth, and/or Wifi and and/or 5G WAN wireless networking capabilities and their availability, hours, geolocations etc., when appropriate/authorized. When AI robots perform the deliveries, they too may need and include their own unique technical parameters/data/interfaces for too.

"Tech Stack Awareness": The intelligent ability to learn, store, maintain, update 'operational state' and all relevant data and to adapt to utilize this knowledge/data in real time which may include e.g. geolocations of customers or drivers and intelligent messaging to/with them and/or with provider staffs and to discern real vs. AI bots etc. and then intelligently interact (e.g. using smart phone/texting verifications in lieu of passwords and/or other channels) and by using alternative contact channels, with e.g. connected devices, services, ordering aggregators, providers, drivers, entities and/or consumers by considering and applying one or more aspects of a multiplicity of the e.g. 'operational state', technical, system/device, operational data/information, state, social media information, geolocations and/or personal consumer information/preferences etc. that makes up their respective complete tech stacks. By recognizing and utilizing this more comprehensive understandings of with whom and/or with what each are communicating/integrating with, greater and better results can be achieved.

"Tech Stack Integration": 'The ability to utilize 'tech stack awareness' to achieve, update, maintain and optimize deep bi-directional integrations with e.g. connected devices, order services, entities and/or consumers via HTTP, WI Fi, 5G and/or other protocols, real time delivery time updates and automatic integrations with some or all of the available data/information, from their respective 'tech stacks' which include e.g. restaurant menus/reservations/hours etc., hotel/rental availability, ticket/event availability and also supports consumer retention and deep frequency/loyalty/rewards functionality and which usually includes rules/standards and API's.' And both hotel and ticketing aggregators/suppliers now can and often do include options for food/drink integrations as well, along with real time-cross application deep sharing/linking of customer frequency information, "Operational State": 'For the Food/drink delivery embodiment, the order provider restaurants, ordering consumers and/or order deliverers are 'operationally stateful', when they 'plug into/connect' into the network to initiate and/or respond to an order and they are 'operationally stateless' when they are 'plugged out' i.e. disconnected and this is the same for the other embodiments, yet usually without deliveries and this is a key factor relative to overall 'tech stack awareness'. For the other embodiments, being 'operationally stateful' occurs, e.g. during the period, of actual order based digital activity/connections, between e.g. the 'ordering consumer' and the 'order aggregators' and/or the 'order provider'.

"Order Equilibrium" The ability for the network to establish and then maintain order consistency throughout the completion of that order/transaction, for all the connected devices/elements and communications within a 'temporal order intranet network.'.

"intelligent 4D spherical scaling": A four dimensional, cloud and rule based framework providing the ability to intelligently scale computing, and/or storage resources/services by concurrently assessing systems loads, current data, and/or tech stack data in real time, exploiting Microservices based flexibilities and applying established rules and load balancing—to minimize network latency, throttling resources when needed, and while seeking to maintain performance, while concurrently balancing loads by applying and then seamlessly integrating the applicable time factors by intelligently applying the date/time based factors/elements as is shown and explained herein e.g. as in FIGS. 1-3.

"AI Orders/Integrations": 'Ability to interface bi-directionally with AI agents and/or robots leveraging knowledge of the consumers 'tech stack' to place orders on behalf of that consumer, and yet still maintain transaction consistency.'

"intra-scalable microservices": 'The ability for, e.g., one or more microservices to intelligently scale via caching and/or message queueing and independent of other connected microservices and/or services and depending on it(s) own unique demands/needs at any point in time but which may also be integrated in parallel with other closely related/linked microservices, if, when and to the extent appropriate for the particular microservice and/or embodiment and the system load at that time.

"Time Syncing": 'Synchronization of accurate time, within a computer, and/or multiple computers/servers and/or within networks, via e.g. accessing an approved time syncing server e.g. NTP.Org servers.

"temporal order intranet networks": The temporary intranet between two or more of the above four 'ordering segments', which is rapidly established by the 'order aggregator' and/or 'order provider', when appropriate in response to an initiating consumer order and which maintains communications session affinity and state until completion.

"automatic bi-directional communications channel switching": 'The ability to automatically and intelligently switch from one communication channel to another and back (e.g. email to texting/chatting and back to email and/or e.g. browser interfaces) during the course of and/or promptly following the completion of a consumer order/transaction in order to optimize performance and/or overcome latency and/or communication channel delays and/or failures.'

"Omnichannel Communications": 'Achieving a uniform and consistent customer experience across a wide variety of disparate devices, interfaces and connected channels.'.

"Transactional data (TD)": 'information that is captured from transactions and can also be referred to as 'data in motion'

"Analytical data (AD)": 'machine examinable and/or examined data, which can also be referred to as 'data at rest' to find trends and draw intelligent conclusions about and develop rules from the information it contains'

"Machine learning (ML)": a field within artificial intelligence (AI) in which software applications, operating on computers and/or servers and linked with data storage solutions including e.g. databases and/or Data Warehouses and/or Data Lakes, can capture, store and analyze both 'real time' TD data and 'non real time; AD data and learn, store and assess that data and over time become more intelligent and accurate in anticipating needs and predicting outcomes, while also optionally developing appropriate rules for their application/use.

'Session Affinity': 'Maintaining computer state, session persistence and/or consistency throughout a transaction/session including e.g. ensuring that all subsequent and/or related communications, traffic and/or requests resulting from an initiating order and/or action are uniquely and uniformly routed and distributed.

'Wireless handheld computing device: 'a computing device that is capable of wireless communications and is sized to be held in one's hand'

'App Store Mobile Applications': 'Mobile apps, (including, e.g., lighter 'web apps' and all their variations) and both branded and/or aggregator applications tested and certified by either the IOS or Android App Stores.'

'Non App Store Mobile Applications': 'Mobile apps (including e.g. lighter 'web apps' and all their variations) and both branded and/or aggregator applications that are not tested and certified by either the IOS or Android App Stores.'

'Real Time Machine intelligence': 'OLTP type Performance and/or TD data Monitoring in real time and intelligent application of rules.'

'Non Real Time Machine Intelligence': 'Data Warehouse, and/or Data/Lake, and/or other database OLAP type based Analysis of historical AD data, and the development of reports, alerts and/or intelligent rules.'

'Combined, Concurrent OLTP/OLAP Machine Intelligence': 'the real time merging of both OLTP type and OLAP type related data analysis across the computing data and data storage network as appropriate.'

'API/Array/Gateway:' The 'ordering aggregators' array of e.g. API interfaces, rules, forms and/or messaging formats, enabling, both real time and non real time interactions and data exchanges, between e.g. the appropriate aspects of the tech stacks of both third party systems and/or ordering consumers and/or order delivers and/or order providers intranet interactions/communications, social media links and with various AI components/services, and to e.g. provide the ability for the various elements to change their 'operational state' by e.g. digitally plugging into/out of the network and which may include various communication options e.g. via multiple data streaming, protocols and other similar messaging and gateway options and also e.g. with/to various cloud computing suppliers/services and datacenters/databases and optionally to/with its own microservices as well.

'Central Data Platform': 'a multi layer data architecture, serving as a data hub and its data, and that can be distributed in accordance with particular embodiment/network requirements and which includes three or more of the sources, ingestion, storage, processing, security, and visualization layers, and which provides a framework to collect, combine, store, transform, analyze and/or report on the data and including one or more schemas when and where it is advantageous.'

BRIEF DESCRIPTION OF THE DRAWINGS

The foregoing and below features and advantages of the multiple embodiments can be appreciated more fully from the following descriptions, and with references to the accompanying exemplary, not to scale drawings.

DETAILED DESCRIPTION

Figure 1:
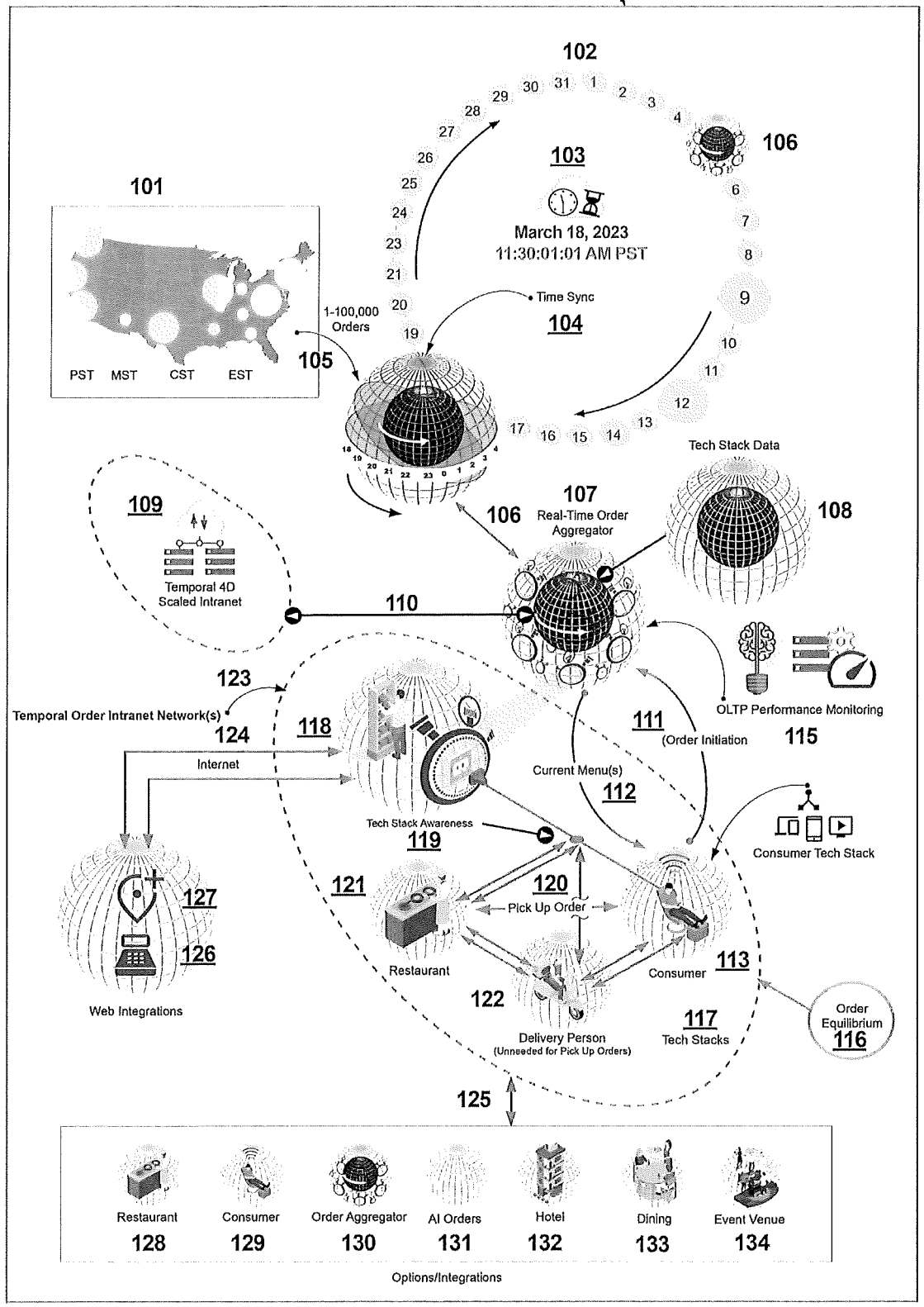
FIG. 1: An exemplary real time flow diagram for an exemplary adaptable computing network framework for embodiments.
Figure 2:
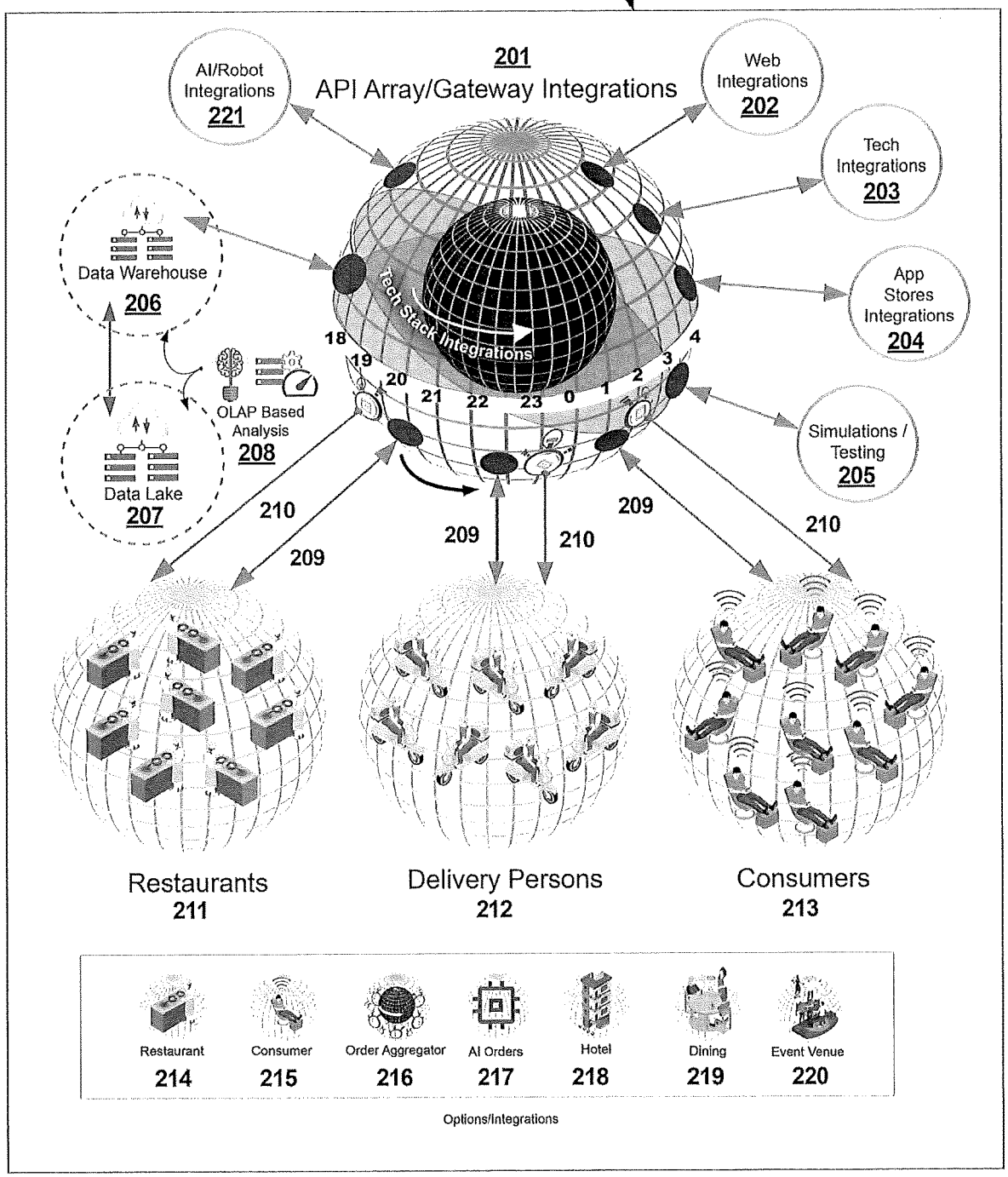
FIG. 2: An exemplary non real time flow diagram for prior actions/integrations/interfaces supporting the real time adaptable computing network framework in FIG. 1.
Figure 3:
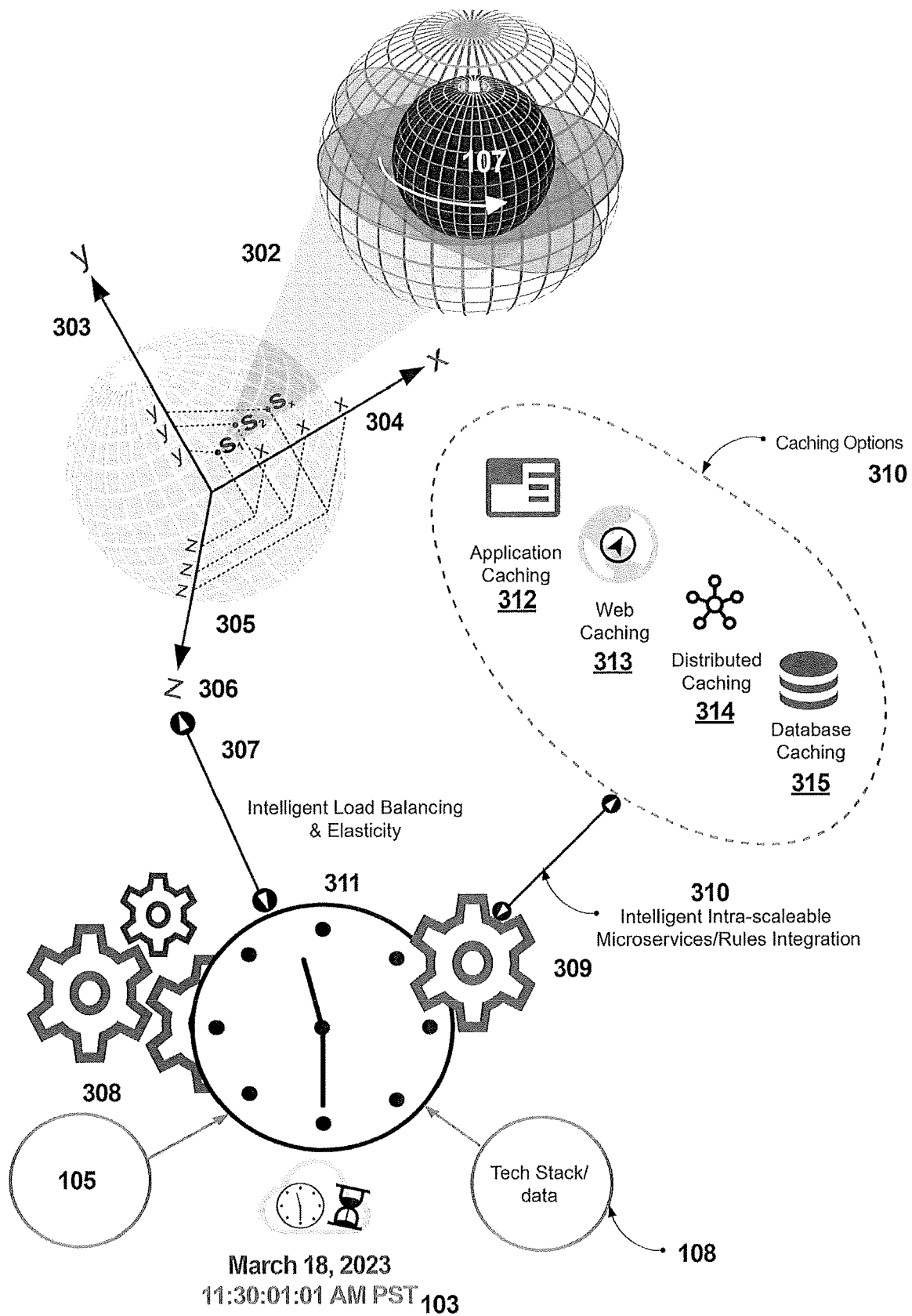
FIG. 3: An exemplary flow diagram showing Intelligent 4D Spherical Scaling and Elasticity functionality supporting the real time adaptable computing network framework in FIG. 1.
Figure 4:
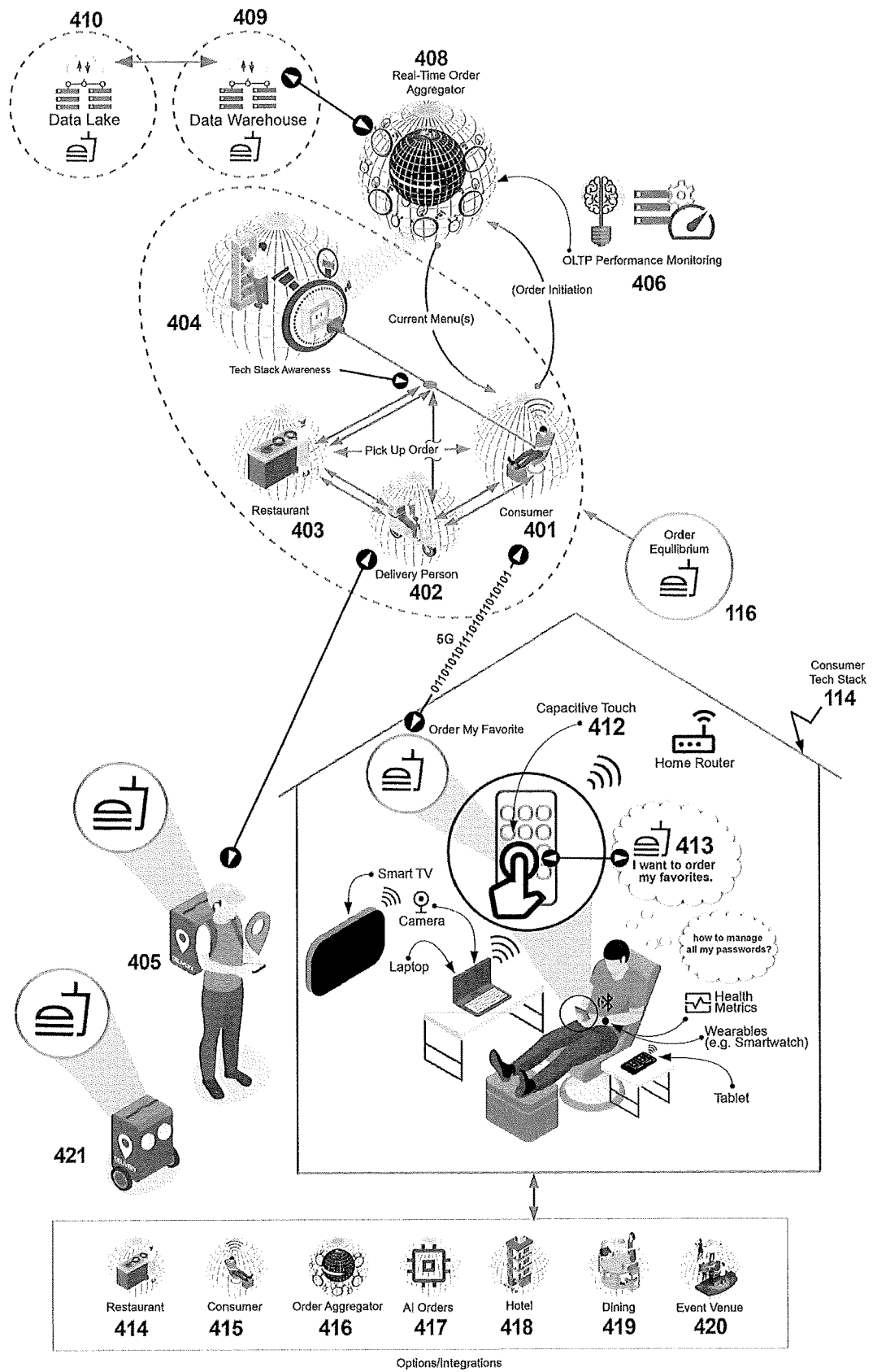
FIG. 4: An exemplary diagram showing examples of Order Equilibrium and Consumer Tech Stacks supporting the real time adaptable computing network framework in FIG. 1.
Figure 5:
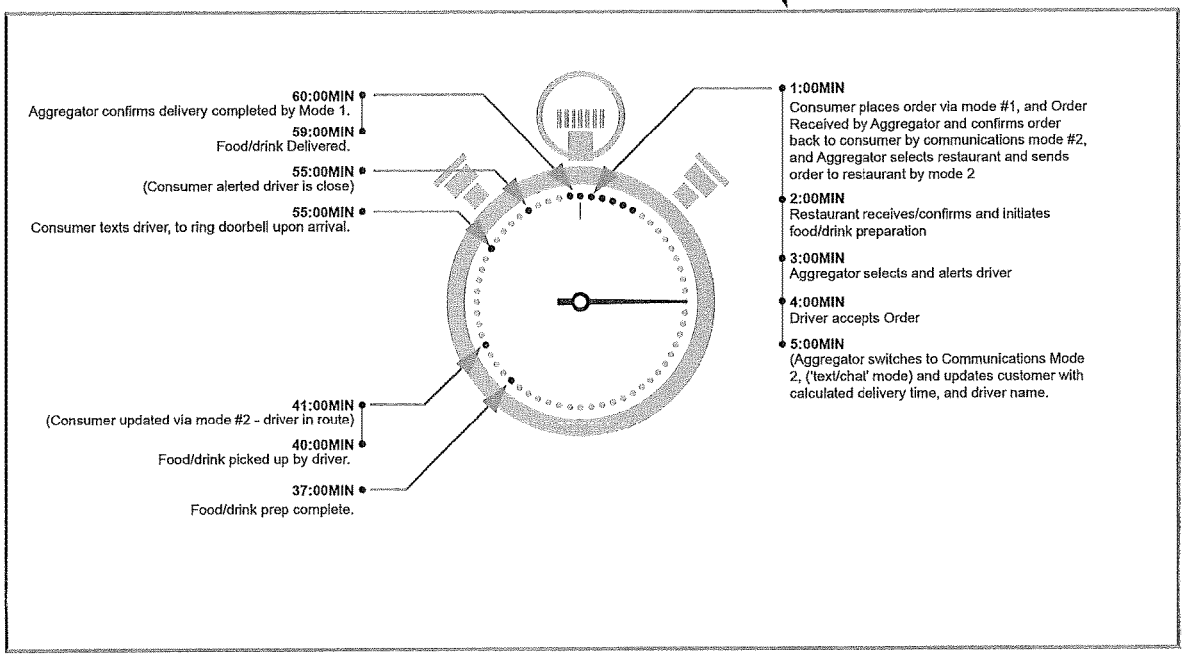
FIG. 5: An exemplary timeline for an exemplary order occurring within the real time adaptable computing network framework in FIG. 1 and reflecting the timing for automatic bi-directional communications channel switching.

Exemplary embodiments, of four hospitality market applications and the various solutions to existing/prior problems/limitations are shown in FIGS. 1-5 and are discussed in detail below. FIG. 1 is a real time flow diagram and framework, starling with exemplary order, 111 which is supported by FIG. 2 flows/actions too, (yet which precede the real time activities of FIG. 1) and FIG. 3, flows and actions, all of which may integrate together in an ordered combination and which together are further supported by the explanations and teachings from FIGS. 4,5 and their supporting explanations, that follow below. FIG. 3 reflects exemplary actions/steps, application of rules, and Intelligent 4D Spherical Scaling optimizations resulting from the real time and non real time actions/flows from FIGS. 1,2 and then illuminates the response to meet the demand at that moment through the optimal/timely scaling/elasticity for the network as of Mar. 18, 2021, at 11:30:01:01, and which is occurring inside 107. These flow charts, and the associated technical guidance that follows herein, teach and enable a POSA to architect the adaptable system/framework/network, and design and/or code e.g. the requisite software and/or communications standard/rules, API's, microservices, software interactions, and/or database architectures as well as the scalability rules and technical approaches for the adaptable, computing network framework and as appropriate for the particular embodiments and/or ordered combinations, or only selected elements of same, disclosed herein. These figures, and their explanations below, all align with and optimally exploit the time elements/factors, which together yield the Intelligent 4D Spherical Scaling functionality and reflect and may utilize all time factors, in new and better ways, inclusive of looking backward in time, for/from historical data and lessons learned and to optimize the actual real time performance while also positioning the network/framework to be 'adaptable' for the future as well. The time elements, as utilized herein are especially relevant and impactful, because the supporting computing and database infrastructure and services, change continuously over time as demand ebbs and flows and requirements change. As shown in FIG. 1, and utilized throughout these figures and explanations below, these figures depict and represent a particular 'snapshot' in time. i.e. the exemplary Mar. 18, 2023 at 11:30:01:01 in which the initial exemplary order 111 is placed (yet again this is merely one order, out of the many such orders in 101) and that consumer becomes 'operationally stateful', and thus then leading to the 'order aggregator' to spin up and create the 'temporal order intranet network' 121, for the order of 111 and with the related elements, now interconnected and their states tracked and maintained. This exemplary order is assumed, for exemplary purposes only to take one hour from initiation to completions, as is shown in FIG. 5, and during this period, the interconnected elements of the aggregator, provider, delivery person and consumer are all linked/integrated and operating together in ways clearly guiding and teaching the POSA. Each are 'operationally stateful' during the period of the order.

This disclosure and the exemplary embodiments introduce and rely upon multiple terms from the glossary above including four important terms for these embodiments: 'Order Aggregator', 'Order Provider'. 'Order Delivery Person/Robot' and 'Ordering Consumer'. However, again many other embodiments are possible too. Thus in the context of these embodiments, restaurant reservations, hotel/rental reservations and event tickets, are all 'orders' as are their respective aggregators and/or suppliers in their respective embodiments. The food ordering example is the primarily disclosed embodiment, yet the other three embodiments and more are taught through these inventive disclosures. These embodiments are thus merely exemplary and persons of skill in the art would/will understand the many myriads of variations that are possible from the teachings in this disclosure. Discussion and explanations of these teachings and the guidance and frameworks they provide for architecting the new and improved systemic solutions/systems disclosed herein, are initially focused on explanations of these overall figures, with specific references to variants/alternatives and then followed by more detailed explanations of their individual components/elements and the teachings of the respective details of the individual parts/interfaces/concepts/elements, integrations and/or solutions including numerous specific variants and various alternative embodiments.

As is discussed above, as to the glossary of terms, when used herein those terms and their constructions above will be applied, (subject to the knowledge of persons of skill in the art), to include that when they are part of ordered combinations, those combinations might in some instances, yield a slightly different understanding, than when/if a term is used on a standalone basis.

FIG. 1 provides a real time flow diagram and reflects an embodiment and framework; however not all of the elements within this example are required for all embodiments and persons of skill in the art, could and would recognize a multiplicity of different combinations and options, as shown in this figure and as linked/associated with the further details in FIGS. 2-5.

As is discussed above in the summary, FIGS. 1-5 and their depicted inventive concepts and framework not only provide new solutions to the existing/prior problems, but recognize, depict and define the problems/needs in a new and revelatory way. This is vital and valuable for the full appreciations of the inventive concepts disclosed herein; especially within e.g. the complex cloud computing based world in which disparate services, microservices, computers, services, communications links/protocols and parties interact, integrate and interoperate with each other and herein, while considering all time factors, and especially at the very large and demanding scale and/or hyperscale of the largest order aggregators.

Turning now specifically to FIG. 1, see 100. Note: that each of the elements of FIGS. 2,3,4,5 all relate to and/or link from/to/with elements from FIG. 1, at least in part as they are depicted in an exemplary way in FIG. 1, yet provide more detailed explanations/teachings. Thus the entirety of the detailed disclosures herein, may revolve around and/or relate to the real time flows in FIG. 1, directly or indirectly and (one way or another), again, may be complemented and illuminated with the construction of the relevant technical terms above, from the glossary above and all of which are imported into their usage in FIGS. 1-5 and/or in/with the explanations below.

Orders e.g. 111 are initiated from ordering consumers, e.g. in 113, and many others from within the broader United States as shown in 101. Note: Alaska/Hawaii are not shown, but they are clearly part of the United States. The orders originate across the country from 101, and in respect to the time, within their respective time zones. As a POSA would know, order volumes/velocities will often but not always fluctuate from one time to another and from one time zone to another, as well as from one geographic area to another within a time zone, and to optimize speed/performance, optimally distributed computing centers, across the geography can contribute to improved speeds/efficiencies, while also providing inherent redundancies. The various e.g. exemplary time factors, as shown, in e.g. 101-107 are all relevant to the inventive solutions. 102 reflects the monthly calendar, (rotating from day to day), and shown, for this particular embodiment/example, 103 to be reflecting Mar. 18, 2023. The precise time in this example, is 11:30:01:01, as shown, on this date. The systems/networks time validation/accuracy may be achieved/confirmed/updated, (in a frequency that a POSA would select and understand) e.g. by interfacing and confirming the precise time, via e.g. a 'Time Syncing' service and/or server, and for the purposes of this disclosure, the NTP.Org Service is shown as the exemplary choice, but any other suitably accurate time source is possible and there is no specific time accuracy required; rather that is dependent on the particular application/embodiment. 105 is a 'spherical representation' of the 'order aggregator' tech stack, first the outer diameter is the totality of all its potential/actions/activity/resources and/or available tech stack computing/communications/storage resources available to the 'order aggregator' by e.g. either its own existing resources, contracted cloud based resources, linked datacenters and/or other cloud based sites/services/microservices and/or the inherent ability of those linked resources to scale and/or change elastically in response to the time based needs of the order aggregator. The dark, inner circle in 105, depicts the actual computing/communications/database resources, in use/operations that is merged with the 'tech stack data/state' information from 108, to yield the dark inner circle in motion of 107 (and as is alternatively depicted as part of 'Temporal 4D Scaled Intranet' 109 at this exemplary temporal date/time e.g. at 11:30:01:01 on Mar. 18, 2023 and with the white arrow inside 107 depicting exemplary increasing load/speed/capacity. 106, shows, for example, an earlier day in the month, Mar. 5, 2023 when system loads were higher than usual, yet still significantly below the depicted heaviest load day of the month, here e.g., Mar. 18, 2023. Similarly, in this example, the loads were higher than usual but between the maximum, monthly load of Mar. 18, 2023 and the higher load on Mar. 5, 2023 on both Mar. 9, 2023 and Mar. 12, 2023. As part of the inventive solution and concepts, these varying usage/loads at different calendar dates, (reflect, to the extent possible/known), predictive and anticipatory usage/load levels, based upon historical levels on particular dates and/or days of the week, and reflecting trends, while applying Machine Intelligence resulting from e.g. the exemplary OLTP and/or OLAP analysis, 208 and optionally an even deeper combined analysis of the two to the extent possible. The combined exemplary time related inputs/factors (from 101-107) and the 'non real time' inputs from FIG. 2, (via 108 as shown) are inputs into the conceptual 'Order Aggregator' sphere 107 and which integrates conceptually and bi-directionally with the central data platform via data communications, and in a continual sense, since clearly, the network loads change continuously over time. Yet, these conceptual spheres are in actuality combined and the same, —rather they just are depicted/shown differently here, so as to optimize the clarity of the inventive teachings and concepts amidst the complexity of multi faceted and distributed cloud based solutions.

Within the 'Order Aggregator' sphere, 107, the exemplary multiple stopwatch icons reflect the multiplicity of ongoing/active—'operational stateful' orders at any given time, and which are using the computing/communications resources and central data platform within the inner dark circle as of that moment and which also are also depicted and thus visualized within 109 and these conceptual stopwatches are shown in greater detail within the exemplary oval, 110, which itself depicts, conceptually the 'Temporal Order Intranet Network', which at any given moment, and especially at large aggregator scale and or hyperscale, might reflect, thousands or even hundreds of thousands of such instances. Thus this concept reflects, (to the extent it would be possible to physically depict the vast, computing/communications resources actually in use/deployed), at the given moment in time e.g. Mar. 18, 2023, 11:30:01:01 throughout the distributed computing network/resources and e.g. which may be distributed and spread across multiple locations, e.g. the central data platform, datacenters, data storage facilities, services etc. dependent on the application, the systemic approach and the date/time. In the real time sense, continual evaluation of OLTP e.g. 'data on the move', i.e. transactional data (TD) is evaluated/assessed/processed/stored and while intelligently applying applicable rules, (if any) and utilizing machine learning and machine intelligence and as is shown in 115. Machine learning is directed to understanding and learning from data to improve performance and anticipate trends, needs, requirements, load capacity and more, develop optimal rules, when appropriate and is a sub field of the broader context of artificial intelligence overall. Aspects of the data analytics as part of the machine intelligence disclosures and integrations herein, include cognitive, diagnostic, prescriptive, predictive and descriptive types of analysis. Analytics can be performed on either or both 'data in motion' e.g. transactional data (TD) and at 'data at rest' (AD) e.g. historical, and both are disclosed herein, as is shown in FIGS. 1-5. Machine intelligence functionality requires well architected and managed data storage solutions/options, e.g. central databases and/or data warehouses, which can aggregate data of many types, and sources to enable multi-faceted, systemic analysis and which can be coupled with tools and presentation options to enable staff to e.g. visualize, in real time and/or near real time and which they surely could not, without such analysis and presentation options and solutions. Data warehouses can be virtual as well. Further clusters, as part of the solutions herein can include either or both computing and storage functionality concurrently.

The exemplary, consumer, 113, again, of which there can be very large quantities of, at any particular time, can initiate their order, as in 111, either from stored menus/options/data via e.g. wireless handheld computers, normally smart phones and/or tablets, but also browser/web pages and other device alternative are included as well to include various AI options as is also discussed further below, but more normally, (with todays very high data rate wireless speeds, the current menus, tickets/reservations etc. are updated, 112 in real time, and thus at nearly the moment that the consumer 'plugs in' to the respective network and thus becomes 'operationally stateful'. Further, with more and more mobile apps, becoming web apps, almost all of the data is updated so rapidly, for the consumer, that they can barely determine/discern, whether they are working with a mobile app, as opposed to a web app and/or a variant of same, all of which as a POSA would understand them are part of the disclosures herein. This is one of the changing paradigms from the incredible advancements in communications/computing speeds/power. Operationally, for these disclosures—multiple options and all similar embodiments are included herein. Further still, the disclosures also include both 'app store' controlled/tested mobile apps and 'non app store' mobile and tested apps, and also the soon to emerge as a real need/embodiment, combinations of both, and combining them in an integrated way is a new, inventive solution for a problem, just now emerging but which will take on even greater importance ahead. Order providers both individual stores and associated stores and/or chain stores, benefit from their own branded mobile applications, as well as fully enabled, web based ordering, and all such options, are included in the disclosure herein. Standard internet/web based orders, both from the order providers and/or aggregators initiated from e.g. laptops and/or PC's, tablets etc. and from other such computing devices are also included. 114 depicts the 'consumer tech stack' concept, which is explained, and discussed in greater detail, subsequently, and also shown in FIG. 4.

The requisite computing/storage elements, to support and enable the adaptable network functionality, e.g. the web servers, virtual web servers, clusters of each as appropriate/needed, and the requisite data storage elements, and/or services needed, both for the immediate, real time activity and long term, storage, along with the associated software and microservices and the communications control software modules and interfaces, are represented within 109, yet many of the elements, vary in size and/or in instances, depending on the particular load at any given, time, here again in the exemplary instance as of Mar. 18, 2023, 11:30:01:01. That these computing/storage elements vary over time, and are often leased/contracted, via various third party services and/or through and at various datacenters etc., does not impact in any way, that at each respective moment, in time, the utilized resources are under the control of the 'order aggregator' and/or as/when applicable, and in respect to their own needs, the 'order provider', when they too, exploit the concepts of the adaptable computing framework disclosed herein. Further, the overall database of the 'order aggregators' and/or the 'order providers', when applicable are stored appropriately, in their respective locations/sites and/or via the established services and/or resources that they are utilizing.

Further providing the operationally flow, to guide the POSA in e.g. architecting, setting up, designing and/or programming the new solutions hereinafter the order 111, is sent/received by the aggregator, and again, (usually, but it is not required) for the updated/current menu and/or reservations/tickets, etc., 112 being sent back to the 'ordering consumer', then the Temporal Order Intranet Network' is formed, and the respective elements within the large oval, 110 are linked, (and their state is monitored/controlled for the period of the time of the order, at least), and see FIG. 5, discussed later. These individual elements are tracked/linked and associated with one another, as if they were physically connected, (yet this is not the reality), rather this is merely in the digital sense/perspective. For food/drink orders for delivery, the 'delivery person' 122, (or a 'delivery robot/drone' 131 as is discussed further below) is also digitally linked, however this, of course is unnecessary/inapplicable for pick up/take out' orders by the consumer at the selected restaurant 121 and as is shown, occurs via the link directly between 113 and 121. The above events/actions/steps are occurring within the 'temporal order intranet networks', e.g. 123 which are created and spun up/initiated, in response to the 'initiating order', 111.

The 'state' of the elements is maintained/tracked, during the existence, of their 'temporal order intranet network', 123 and the timing of the events, is shown, in an exemplary timeline, as is shown in FIG. 5, and discussed in detail subsequently below. As explained and a POSA would understand, there are a multiplicity of these 123 'intranets' being created/utilized at any given time, dependent on the number of initiating orders, that have become 'operationally stateful'. In parallel, with the ongoing multiplicity of these events/actions/reactions, the entire system and network, e.g. in 107, is monitored, via the activity in continuous performance monitoring and application of machine intelligence 115 and which is discussed in further below.

Further, while most of the activity occurring in response to the initiating order, 111, occurs within the intranet, 123, there are needs for external interfacing and interactions, (outside the intranet), via the internet. 124 and with the exemplary interfaces and functionality, of e.g. payment processing, 127 and GPS based mapping/directions 126. These are merely exemplary internet functions/links/interfaces and all such internet links are part of the disclosures and solutions herein as a POSA would know. Further, the aggregators and/or providers, also have multi faceted and bi directional integrations and activity over the internet and with internet providers, independent of individual consumer transactions, and those mostly occur via the API Array 201 in FIG. 2, but once established may and often do occur in real time, as part of the depicted network/framework of FIG. 1 as well. Session Affinity is maintained.

Ongoing with all of the above activity and interactions above and other related functions/details discussed/explained further below are the newly introduced concepts and functionality of the linking of selected and relevant aspects of the respective 'tech stacks' and the new concept of 'tech stack awareness' 119. Also shown, in 114, is the newly introduced concept of the 'consumers tech stack' and which is shown/discussed in greater detail, below and further shown with respect to FIG. 4. However, as is detailed in the constructions above for the 'tech stacks'—within this disclosure, and the concepts herein, their definitions, are unique/new to this disclosure and are not used herein in a commonly known sense. In a generally known sense, the term 'tech stack' is generally used only in reference to large enterprise system e.g. the 'order aggregators' herein and often 'order provider' chains e.g. restaurants and/or hotels, but now, even individual restaurants, and/or hotels, event venues are perceiving and becoming aware that they too, have a 'tech stack', albeit a much smaller one. However, the limited prior common uses, do not, include what the expanded definitions herein do include, which is the added aspects of optionally tracking and maintaining personal and/or personnel data/information and/or when/if appropriate the respective password/details of each, along with, and when appropriate/authorized, the real time GPS locations of each. This is new/unique to this disclosure. However, as is explained, e.g. most consumers, don't yet realize that they actually even have one, yet they do. Rather, they might view it e.g. as merely 'all my tech stuff', be rather overwhelmed by it and often don't really know/appreciate e.g. that it represents as vast a set of devices/data/choices/options as it does. Many consumers don't for example even realize e.g. that their responses to their internet web queries are returned to them, from a 'cloud based' solution. Yet, the continual advancements of the $21^{st}$ Century will press consumers to learn more and more.

Again, this disclosure as is depicted in 114 and in FIG. 4 introduces the entirely new term/concept of a 'consumer tech stack' and like the previously discussed 'tech stacks' is expanded herein to include not only the actual equipment/devices etc., used e.g. within ones home and/or multiple homes, auto, and/or work locations, but also ones personal information to include e.g. the plethora of one's many passwords across the vast array of interfaces, web sites, emails, favorites/preferences and/or allergies and the like, cell phone numbers, home and/or home office phone numbers and the multitude of wireless connections including e.g. PAN/LAN/WAN interfaces/networks. Further, consumers use/order from a variety of digital sites, locations/entities, phone numbers and e.g. in the restaurant embodiment, not only from multiple aggregators, but from chains serving as aggregators and/or providers themselves, and sometimes from their individual locations directly and/or dealing with entirely independent restaurants and or hotels, or even now venues too. It is an ever expanding and difficult task just to make the choices as to which device to use, which app to use, which payment option to choose and in the food ordering embodiment, even deciding which delivery option to choose from, based upon a wide variety of changing factors, including e.g. cost, time of delivery, quality, reward points etc. The average consumer now also has a vast number of frequency/reward programs, and cross linked/integrated whether they be across restaurant/hotel and/or airline programs and ever increasing instances of cross program linkages to include e.g. points via credit card programs, links to/with Apple Pay, Google Pay etc. Further, inclusive of one's tech stack are the choices and/or tools, utilized to permissibly or not control the tracking of one's digital activity, and cross tracking from the vast multiplicity of tracking tools, apps, and/or bots that seek to glean personal and/or private information about each individual, and which are similar to password controls to protect one from invasive monitoring/tracking and/or even the theft of one's personal and/or financial information. Also optionally included are one's own contacts, personal information, preferences and e.g. their own important dates, such as birthdays and/or anniversaries and the ability to set up contacts and/or send messages and/or thanks/congratulations or even gifts/flowers etc. and at predetermined dates/times, and well into the future and/or repeatedly and/or continuously as well. An example, might be a father ordering and setting up flowers to be sent to his daughter on her birthday for many years into the future, while another example might include access to the vast array of passwords for all one digital interactions/devices, to be made available for a selected person, in accordance with selected procedures and resulting from certain events/conditions. Further still, one's own tech stack information can include dates/times when they wish to not be contacted, and/or specific channels of contact that they wish used and/or not used at specific times/dates, and/or the same as to their contacts, when one or more and/or alternate means of contacts is appropriate for one date/time and not another and the designation of alternate channels, dependent on the circumstances. And this also is applicable to e.g. ordering food, making reservations and/or purchasing tickets, e.g. being set up in advance and acted upon, at the appropriate time and/or resulting from a triggering event, and the ability to have the advance actions, occur, by accessing the information of one's tech stack of information and interacting with external parties, as if one was doing it themselves. Similarly, protecting the privacy of one's biometric information and/or using the tools to be recognized by ones biometric characteristics, via e.g. facial, touch, voice, fingerprint and other such approaches, are also included herein, and from the knowledge of a POSA and included in ordered combinations as appropriate. Additionally, many consumers guard their personal, cell/smart phone numbers explicitly, and don't wish to be contacted, via those mobile phones, without their express advanced authorization. Yet, receiving chat/text updates is becoming an ever increasing and important means of timely and important interactions/notices for security and other such purposes etc. Further, to the extent the consumer authorizes it, their personal location, determined/tracked via e.g. GPS links etc. Today, most, if not nearly all consumers don't even recognize and/or remember all of the vast totality of all of their interfaces/passwords, networks, devices etc., exist in the aggregate and/or that while not all directly linked it is at least loosely linked/integrated. In parallel, with these functions/interfaces etc., there has been and will continue to be an ever increasing need/requirement to prove that the consumer 'is whom they are' and that they are a 'human' and the particular/unique human/person, and located where they state that they are and that outside entities believe that they are interfacing/working with and which is why there has been an ever increasing need foe technical needs to probe and confirm that one is not a 'Bot' and/or an AI solution/element. The importance of this will be vastly increasing ahead, and the need for the 'tech stack awareness' as is discussed next, below. As is discussed throughout this disclosure, when the consumer sends in an order and/or alternatively e.g. logs in and/or messages/communicated with any of the other entities herein, their 'operational state' changes to 'operationally stateful' as disclosed herein and back to 'operationally stateless', when they are not connected/linked. And further they can become 'operationally stateful', when one of the entities and/or devices/services initiates a contact/communication with them. This is similar to but not the same as the actual 'state', (in the standard computing sense) that is maintained, e.g. in respect to the e.g 'temporal order intranet network' throughout a transaction, ensuring consistency and/or completion of that transactions and/or other similar interaction, which could also include e.g. an interaction, to 'register' and/or sign in, as in the 'non real time' interactions, shown/discussed in respect to FIG. 2 and to include e.g. merely to checks ones frequency/rewards points, and/or update their stored, profile information. A multitude of such options/choices are all included. Additionally, most consumers, don't like to have to carry/use different smart phones for personal and business use and/or out of necessity they will need to be contacted, while at home, for a variety of reasons relative to their work/business requirements. Or alternatively, when issued and/or using a business smart phone, they will need to or wish to do personal business. Further still, and as has been vastly accelerated by the Covid 19 epidemic and the enormous number of employees compelled to work from home, many don't want to leave and return to the office and consequently their home has become now and likely for many will continue to be their 'work place'. They might use dedicated computing devices there, e.g. a business laptop, with its own security and/or unique functions/programs and/or interfaces, but even then, that device must, at least in part work through aspects of the 'tech stack' of that individuals home to include e.g. their 802.11 WI FI and/or WAN networks, and thus the lines between 'personal' and 'business' use are blurring and likely to become even more so ahead, especially with the imminent and growing implications of AI. Consequently, work/business mobile apps and/or other requirements/interfaces/services and/or password needs exist, and can optionally also be considered within a consumers tech stack, as is disclosed herein. Thus, as asserted/explained herein, whether the average consumer recognizes it or not, they have a 'tech stack', they just might not fully realize it and/or its breadth yet. Further, a manager of a store, hotel and/or venue, might have mobile apps, loaded onto their smart phones, unique to their business and/or access them from e.g. browser and/or other current/emerging means of contact from their home. And the additional option, of a consumer having their own AI agent, and/or robot, available and used by them is already emerging and as to all the other steady technical advancements ongoing, it's only a matter of time, that a consumer has e.g. physical robots performing tasks for them to e.g. physically be meeting the delivery person, at the front door to accept/obtain the delivered food order. For personal safety reasons, this option will be advantageous depending on the location of one's home and/or location the delivery is directed to travel to for the delivery. That exemplary AI based robot may have its own links, persona and/or digital addresses and/or identity too or it and/or merely a software based AI agent, might act entirely on behalf of the consumer, at times simulating that they 'are' that consumer. With access to and knowledge of the email addresses and/or passwords etc., from the 'consumers tech stack' in the emerging technical sense, it will be an increasing technical challenge/task, for the other entities to determine just whom had actually placed the order and/or with 'whom', or even 'what' they are actually interfacing/communicating with. Further options to protect and maintain privacy and limit external/remote access to specific applications and/or interactions are also integral to the solutions herein and to one's own 'tech stacks' and again any subset and/or combination of these options/interfaces/applications/devices, (from small to large numbers/amounts) are still part of the overall 'tech stack' which is the superset of all and further the subsets/options therein change over time and/or when the consumer changes them e.g. purchasing/adding a new 'device' and/or signing up for a new social media account and/or downloading a new mobile application. Further transactions build loyalty points and build data about the consumers. A POSA, can, following the above guidance and the adaptable framework, combined with this guidance and the related guidance from the flows as are disclosed in FIGS. 1-5 and can develop and maintain software applications to provide this functionality inclusive of 'tech stack integrations' and 'tech stack awareness' functionality from the consumer perspective/needs. This can also include a mix/combination of both 'app store' tested/generated/approved mobile applications, and 'non app store' tested/generated/approved mobile app applications, and integrate them, with one's own apps, other services, other AI based options, internet/web browser based options and provide new, ordered combination functionality, e.g. a 'non app store' mobile app, that tracks all of ones frequency/rewards programs across applications, and services and ensures one is fully and fairly rewarded, and automatically can seek out resolutions when shortfalls and/or problems occur and to generate alerts/warnings as appropriate and as a POSA would know to do. These solutions may also include both internet/web based applications/services, mobile/wireless services/options and multi faceted mobile applications, all of which can be part of ones 'tech stack', but brought together, here, uniquely and for the first time, as part of ordered combinations, never before integrated, linked and/or synchronized. However, while a new software application is possible and guidance for this is disclosed and taught herein, as a POSA would understand, the disclosures herein, as to 'consumer tech stack' and as part of the ordered combinations, do not require an actual or new software application; rather that is only an optional embodiment. The recognition, by the consumer and/or the aggregators and/or the providers that all of their previously disparate and non linked, non integrated and non synchronized functions/devices/data/interfaces should be considered in the aggregates sense herein, and should be tracked/recognized/interacted with as such, and personally integrated, to whatever extent deemed appropriate, and viewed as a cohesive whole is new, novel and non conventional and it solves problems, that were not even recognized before, yet as is explained herein, will become increasingly more important.

While not including as vast of an array/suite, of technical options/data, devices, passwords and/or interfaces as in the 'consumer tech stack' sense, this disclosure also introduces the new concept of a 'delivery person/robot'—'tech stack' too. The delivery person must rely on a smart phone or similar mobile device, with an e.g. 5G WAN wireless connection to receive/process orders and must disclose their GPS locations so that their linked/partnered 'aggregators' and or 'order providers' can locate, reach, assign and monitor/track them. And almost always, they are first 'consumers' themselves and are usually providing their own smart phones and 'tech stack' to expand to meet their delivery requirements .e.a 'dual use' application. Thus their 'work/business' functionality usually travels with them. Further, they usually provide their own vehicles too, and thus the Bluetooth wireless connections, back and forth, includes interfaces with the technology of those vehicles, to include e.g. presenting maps on screens to/from their destinations, and/or showing messages/alerts, not only on their smart phones, but both visually on a screen provided by and integral to their vehicles and/or alternatively via a two way audio interface. Further though the delivery person, might, be 'signed in' and 'operationally stateful' with more than one 'order aggregator' and/or 'order provider' at any given time. This maximizes their revenue opportunities and allows them to select orders, most optimal for them. And in the sense of 'operationally stateful' or 'operationally stateless', this is most easily understood in the context of the delivery person, since, they don't wish to receive orders, nor an aggregator to send orders, to a driver that is not ready to service that order.

While there have been some exemplary 'delivery robot' applications, and multiple companies and/or aggregator/providers have been working on these options and still are and this will continue to increase/advance, it is only in the most preliminary of senses, active in 2023. But this will soon change, especially with the extraordinary new and compelling AI functions/service and chat services now emerging. This will never go backward, only forward from today and will become mainstream sooner than many expect. However the concept of a robot, literally delivery and/or showing up with your ordered meal and knocking on your door, still seems like 'science fiction' to many. Yet, so did handheld wireless communicators, introduced conceptually on Star Trek in the 1960s, yet today they are a virtual necessity for modern life and even young children have/use them now. However, in addition to the technical challenges of'self driving' robots and/or 'drones' being viable/practical, they too must also communicate/interact and integrate back and forth with the respective networks and consumers herein and communicate and integrate with all other relevant devices, interfaces, API's and register and report their own 'operational stateful' and/or 'operationally stateless' status/readiness too. Most importantly, they must be able to have 'tech stack awareness' themselves with the other networked elements, and in what will be of ever increasing importance, it and the elements that interact with it, will and to know 'whom', rather 'what' it is. And it is only a matter of time, until whereas todays consumers can choose between 'delivery aggregator' options, based upon time/quality, frequency points etc., soon, there will be options 'will you accept' a delivery from a robot/drone and initially, many will not.

This disclosure also introduces the concept of 'tech stack awareness' 119—a new concept that will be ever increasing in importance ahead, for both the individual consumers, ordering consumer, herein, as well as the other entities herein i.e. the aggregators, providers and delivery persons and/or AI based Bots and robots. 'Tech stack awareness' is also shown in 108, along with 'tech stack integration'. The difference between the two terms is that the 'awareness' aspect is simply the learning and storing and recognizing the data/knowledge, whereas the 'integration' is the data exchanges/interfaces/APIs and the like which enable that knowledge to be exploited and the data, as appropriate/authorized to be exchanged/integrated. Both contribute and enhance herein, but are optional aspects of and to the various embodiments and ordered combinations. Included within the sense and context of 'tech stack' awareness and tech stack integration is application of the understood term of omnichannel communications, but that aspect is only a subset of the broader, superset of 'tech stack' as defined and detailed herein. To initiate a communication with another entity, the consumer usually has multiple choices, and various personas/contacts to select to rely upon and or identify themselves, e.g. business and/or various personal emails, cell phone number, phone number, Facebook accounts etc. along with choosing/selecting payment options etc. The entity they are communicating with needs to recognize them from all of these options, and keep track of them, in multiple ways and across an ever increasing array of options, and as discussed above, now include or shortly will include various AI agents and/or robots 131 operating on their behalf, authorized or sometimes, perhaps not. AI Orders/Integrations functionality is fully supported by the disclosures and framework herein. Additionally the value from knowledge of and about consumers, will continue to increase and all elements, and companies covet and value learning and then exploiting as much information as they can about their consumers and/or their behaviors and/or preferences, even anticipating them, in advance to the extent possible. In order to achieve deep frequency program knowledge and exploitation, programs and/or functions as disclosed herein and needed ever more ahead and which may include the 'tech stack awareness' concept, and optionally the AI analysis of the consumer data is part of the disclosures herein and optionally as part of selected and optional ordered combinations. This leads to an equally compelling and important issue of controlling and determining whom owns/controls that data/information, e.g. deciding whether an aggregator that receives a direct order from a consumer, owns that information, and/or does a restaurant that accepts a direct order, yet uses the delivery person and/or 'order aggregator' own that information. The disclosed solutions and options herein can provide access to the requisite data across and between separate locations, and alternative delivery options/choices, including the ability to pause and restart, all or part of delivery choice/channel options, depending on load and staffing, while monitoring and exploiting the range of online/mobile ordering options, integrated with the POS systems and thus enabling performance and revenue optimization. Further, continual menu changes, optimizations, and streamlining and segmenting is disclosed, which for example, eliminates and/or adds menu items/options for/from the in store and/or online ordering options, due to a variety of parameters that a POSA would know, for example, simply that some items, don't maintain their quality/taste, on deliveries, or long deliveries and/or even in such instances, that deliveries need to be distance/time restricted for certain items, that aren't long lasting and as such, for example, might then be limited to e.g. a delivery range of 10-15 minutes. And, such highly time sensitive items thus need to be tracked and monitored to ensure that they do not become a combined order, with other deliveries, with the resulting delays leading to unacceptably adverse quality impacts. All these options/approaches/concepts/embodiments are included in the disclosure herein and optionally also as part of the new 'tech stack awareness' introduced herein. Similarly and which is emerging the challenge of simply determining whom owns/controls the 'robot' and/or AI' interacted data and just like is described above, in which the consumers will have the option of choosing/accepting an order from an AI Agent and/or robot, ordering providers and/or aggregators will have the option of accepting or not, orders from AI agents and/or AI robots, used by consumers. Similarly, some order providers may simply not wish their food/drink orders delivered by a robot and/or similar AI based option, and thus selection of this option or not is also disclosed and include herein too. However all of this requires, in a world of digital communications determining/knowing with whom one is actually communicating. Thus in the emerging new world of AI, utilizing e.g. 'tech stack awareness' and/or other rules and intelligence to assist in discerning and determining, whether one is dealing with a real person or not, will be of paramount importance/value. Additionally as is shown in FIG. 1, the bi-directional arrows between the elements, and within the Temporal Order Intranet Network, oval, reflect the automatic bi-directional communications channel switching herein, which includes for example, the automatic switching of communications channels, e.g. email to text/chat and back, and in accordance with the knowledge of the various tech stacks, and as is shown, in respect to time/sequencing in the exemplary FIG. 5. In the exemplary time sequences of an order as shown in FIG. 5, the disclosed 'automatic bi-directional communications channel switching', occurs at e.g. minutes 1, 5, 41 and 60. This may include application of the newly introduced terms/concepts of 'tech stacks' and 'tech stack integration' too for each of the entities/elements herein, to include new 'consumer tech stacks' and the 'tech stack awareness' that is storing/maintaining/updating one's own tech stack data/devices/interfaces and learning and using what is known about the others own 'tech stacks' to optimize results for each and all which may or may not include a vast variety of subsets and combinations of the overall superset of one's and/or an entities tech stack.

Additional options/embodiments, reflected in the rectangular disclosures at the bottom of FIG. 1, as in 128-134 are available and while introduced in some ways above are further explained below.

While the exemplary restaurant of the exemplary order, of the exemplary 'Temporal Order Intranet Network' above is shown as 121, there are multiple and non limiting, additional restaurant options/embodiments, to be described herein, through 128. If for example, a consumer seeks to place an order through restaurant 121, but it is not available, alternative restaurants can be presented or used, depending on the circumstances. And these options could/can be presented by an 'aggregator' for example. Further a consumer might only seek a cuisine or set of choices/options, and the aggregator and/or an AI aspect/feature of the aggregator, might present/choose options. Additionally, a restaurant has the option of utilizing order aggregator and/or other delivery partners and resources to be in effect 'white labeled' and appear to be working directly for them and in processing their delivery orders and as such, the restaurants must be able to seamlessly interface and/or hand off their data and/or orders to/from, other networks and employees and/or drivers outside their own delivery personnel, and of course any restaurant and/or chain of restaurants, and similarly for the other embodiments, can employ entirely their own staff if desired. Further still, the 'ordering consumer' might want to order through an aggregator, from two different restaurants as part of the same order. For example, someone in his family, and/or his/her business and/or group, might wish, one type of food and other different choices. Additionally, these embodiments/options could be delivered separately, from one another, e.g. multiple delivery persons and/or in a combined delivery from a single delivery person and/or single or multiple robots. All of these choices and all of the options and additional embodiments that a POSA would understand are included herein. With the ever changing environments and continual technical advancements, applications of the restaurant ordering technology here, to e.g. travelers ordering via mobile devices, at e.g. airports, events, venues, cruise ships and other such non traditional locations are also options, included herein. Further still, from the perspective of an aggregator and/or provider and/or delivery person, it may become known and possible for a delivery person to be alerted to and assigned to deliver two entirely separate orders, on the same route/delivery if the geographic and time aspects align to make this feasible and in this sense and in this embodiment, additional consumers 129 may be combined and related to the same delivery person, 122. Similarly, a delivery driver, 122 can increase their revenue and be more efficient, if they are given the option, to make multiple deliveries, to consumers, that are located very close from a geolocation perspective and/or even, where one is along the route to the other. This requires geolocation from the associated order aggregator and coordination/links to with the driver, and relies upon in part, the internet/web connections of 126. Additionally, both the 'consumer' and/or the 'drivers' may interact with and be 'operationally stateful' with, multiple alternative aggregators, concurrently and/or shortly after or before the other as is another option from 130 at bottom. Yet another option and ordered combination, is for a delivery driver to be operating in parallel, with multiple order aggregators (and again chains can be aggregators themselves), and optionally even with two different smart phones, while on the way to, or on the way back from a delivery for one order aggregator, they can accept another order from the alternate aggregator, which might be extremely close and time optimal for them and thus increase their revenues and even speed the overall delivery times, and the hotel embodiments, and restaurant reservations embodiments and the event ticketing venue embodiments are shown below, in 132 and 133 and 134 respectively. The restaurant reservation embodiment, 133 is clearly also a restaurant, but generally a 'fine dining', establishment (but increasingly, non 'fine dining' restaurants are accepting/using 'reservations' and waitlists too) and 'reservations', in the context of the teachings/disclosures here include advance catering orders, waitlists and all combinations of reservations/waitlists and/or other such advanced food orders for time periods more than a few hours ahead, and the same term could/can be used interchangeably as a POSA would understand in the appropriate sense and/or in the appropriate ordered combination. Further and as is discussed subsequently, the waitlisting and or reservations options, are within the hospitality market, as defined herein, and includes consumers and/or gaming players seeking to enter themselves onto waitlists in poker rooms and/or make reservations to sign up and into poker tournaments; either in casinos, stand alone poker rooms and/or any other physical location that provides poker games and/or poker tournaments and to do so via wireless handheld computing devices and/or web browser based interfaces. Additionally, and consistent with the ever increasing need for and value from, the 'tech stack awareness', and thus knowing as much information/data as possible as to the consumers, especially in seeking the deepest possible frequency/rewards benefits and stickiness to optimize the value from returning/repeat guests/consumers cross application sharing/integrating of consumer data will become ever more important e.g. the consumer, who has shared a subset of their 'tech stack' information, with a provider, doesn't want to have to repeat their credit card information previously entered/registered as to one application, in order to be recognized and will want points/credits/rewards, across applications and/or with jointly shared loyalty accounts and embodiments. For example, if an aggregator provides consumers a sponsored credit card and the consumer uses that, the consumer may want points from the aggregators and/or the restaurant chain and/or the credit card, all concurrently—as options/benefits and the data will need to be integrated/shared consistently and automatically to the extent possible and allowed. Further, hotels or many hotels have restaurants themselves and or partnerships with external restaurants and/or aggregators for their guests. Sharing of personal and business information are options disclosed herein, as well as cross linkages of frequency/rewards information, in accordance with rules/procedures and permissions. Additionally venues 134 can have both hotels linked/integrated with them and which again, can have restaurants and/or partnerships with restaurants associated with them too. Further, the integration and linkages of on premise food/drink ordering via the POS system with consumer smart phones for orders directly from ones seat is becoming an increasingly available option and will only advance further ahead and is included herein, to include integration with geolocation functionality. All of these options are part of these embodiments/disclosures and where appropriate integrations herein, and complemented with the other AI teaching/disclosure and options herein, may exploit 'tech stack awareness' to varying degrees and in accordance with permissions as well. Hotel and Hotel Aggregators to some extent, face the same kind of calendar-based peak load issues, for e.g. holidays and/or special events, e.g. a hotel in Phoenix, Az dealing with the 2023 Super Bowl loads/requirements that are unique to it, however event venues, and/or providers herein, often face peak load challenges significantly higher, than the other embodiments, for example, when new tickets are first made available for popular concerts and/or spoiling events. This requires throttling functionality and the ability to hyperscale as is discussed further, below relative to the teaching of FIG. 3.

Additional options from and benefits/advantages resulting from the disclosures and unique combinations herein, include the ability to include these solutions to e.g. address order overflows and to stack/combine orders to reduce costs and increase efficiencies, and restaurants have the ability to either utilize their own in house staff for deliveries, outside aggregators and/or any combination for deliveries, and to enable these solutions to in effect provide innate 'scaling' functionality of their own, albeit in the operational, non technical sense, to address their specific peak load situations, akin to how the computer network itself scales up/down/out technically. Additional options are orders from businesses and/or groups, to include the use of established accounts and/or meal cards with set limits, and which are initiated similarly to an individual consumer order. These options may include advance credits/payments on an individual and/or group basis, or may be reflected in pre paid accounts, and authorized only for particular staff and/or for particular time periods/dates and thus minimize payment processing delays and which can include catering options as well.

Finally, in/with respect to the elements of and disclosures in respect to FIG. 1, the AI embodiment at bottom, 131 may include AI agents, acting on behalf of consumers, and as they become increasingly capable and knowledgeable and an ever increasing and important but optional role in the embodiments herein. An entirely AI based food order, may occur e.g. an AI agent, optionally acting on behalf of a consumer to initiate an order, for a selected meal, at a date/time that is predetermined/set, and that order is initiated automatically, leveraging e.g. the relevant/needed aspects of the consumers 'tech stack' while interfacing digitally with an 'aggregator' that will digitally send the order to the selected restaurant, which will assign the preparation of that order, to appropriate digital assistants and/or robots and then assign the order to a delivery robot/drone, that will travel to the restaurant and pick up/obtain that order from the restaurant, and optionally a robot will hand them from 'robot to robot' and then the delivery robot may travel to the location assigned and deliver and hand the food/drink order to yet another robot acting on behalf of that consumer, and that will then subsequently provide that to the actual consumer. These and all other such options, to include all of the variants a POSA would recognize are integral options and embodiments of/from the disclosures herein.

FIG. 2, is an extension of and a more detailed explanation of 108 from FIG. 1 and follows on the 'tech stack awareness' and 'tech stack integration' functionalities discussed above, however unlike FIG. 1, (which is focused mostly on 'real time' activities), FIG. 2 and its disclosures/teachings, further explained below, are focused more on explaining the 'non real time' activities of the solutions/techniques disclosed herein, to include e.g. registrations and sign up functionalities as well as initial data inputs and updates to them which a POSA would understand/know.

201 is a representation, of the 'order aggregator' sphere, also shown, in different contexts and in different ways, in FIG. 1, as, for example, 105 and 107.

201 can also be considered as mostly a reflection of 'back end' activities/actions, not directly involving, in a real time sense, the 'order processing' occurring in FIG. 1, resulting from an order initiation, as shown, e.g. in 111 from FIG. 1.

Here as is depicted as to 201, it has an array/gateway of API options, shown in an exemplary way as dark circles on its sphere, and again, as a POSA would understand—this is not a 'physical sphere', rather a way to depict and describe/explain the functionality operating together in the cohesive/integrated manners explained herein. Most of the activity within the sphere may be occurring e.g. in one or more, distributed and/or remote, cloud locations and their computing and data storage centers, (either physically or virtually), and interconnected as appropriate and over high speed links/interfaces with the appropriate redundancies and security provisioning and all such options/alternative as a POSA would understand them are optional aspects of the embodiments, disclosed herein.

The API Array/Gateway, 201 which is simply the total of all available interface/integration options made available and/or used, by an 'aggregator' and/or 'provider' is important to the solutions disclosed herein, and will become increasingly so, as the digital connectivity needs continue to soar, and as was discussed above, will be impacted by the ever increasing implications of/from/by AI, AI robots and the like. The various API options disclosed in FIGS. 2, 202, 203, 204, and 205 are merely exemplary and can be referred to as/by other names, or parts of other API options, and/or any combinations thereof, and many other API options are and/or will soon be available and are all included. Further, an API can exist in many alternative forms and need not be called an API; it simply is some kind of set of digital rules/interfaces, which enable the aggregator and/or provider or both to accept data from and exchange data with each other and/or out to/with, other entities/elements inclusive of some kind of established format/protocol, which enables the requisite operations to occur and the data to be understood, stored and processed by the participating entities/devices/elements and/or future entities/needs, and again, inclusive of all AI based alternative options/needs. However, with the ever increasing technical advancements, the requirement for fixed formats and/or rules, will continually be diminishing, because the AI agents, and/or machine intelligence powers/capabilities will continually be advancing ahead, wherein, they will simply become so intelligent, that they can interpret and act on unformatted data and make intelligent decisions without the formality and rigidity, currently required and these aspects may be integrated with and into the embodiments and the many different solutions disclosed herein too.

The API's and the API Array as disclosed herein, 201, provide numerous technical and, operation and strategic advantages and especially for aggregators, seeking to combine/correlate vast numbers of interconnected elements/parties/partners, and in an ever changing, time based state of thousands changing their 'operational state' from 'stateful' to 'stateless' and back, while thousands of others may be concurrently updating their data and/or 'tech stack' information and/or retrieving reports and/or statistics. The APIs' enable ingestion/importation of data/information from a wide variety of heterogeneous types and sources of information, enabling consistency and allowing outside elements to change their own internal systems/data and/or services and/or processes, independently as long as they remain compliant with the rules/standards of the respective API's they are utilizing. The API's provide the ability to establish and maintain schema enforcements, (necessary for consistency and 'order equilibrium'), end to end, and they can be readily accessible and when done/established properly as herein disclosed, they can be very highly scalable and thus inherently and automatically support the 4D spherical scalability disclosed herein, and be tolerant of faults. API's inherently support smooth and ideally high scalability, as again, in support of the intelligent 4D spherical scalability herein, and architected correctly, in accordance with the design and networking guidance herein as in e.g. FIG. 1, they can support massive scale—even hyperscale while being as fault tolerant as possible, while minimizing data latency. This may be achieved while concurrently providing exceptional, bi-directional consistency and while establishing, enforcing, interoperability but setting and/or adhering to existing and partner standards when appropriate/needed to optimize overall consistency and performance, smooth onboarding of partners and minimizing data latency, while adhering as/when appropriate to other relevant standards, Thus, this approach inherently and reciprocally minimizes errors and inconsistencies of prior systems/solutions/networks and thus improves upon them. Further as is disclosed herein and discussed, the solutions and integrations and framework provided herein, enables efficient integrations backwards to/from legacy, monolithic systems, while exploiting API"s and related streaming and/or message broker, interfaces when appropriate and needed, and while seamlessly and when appropriate in accordance with the knowledge of a POSA synchronizing and incorporating optimized microservices, and to minimize/reduce system overhead, which are all advantages and improvements on prior systems/networks.

Further and importantly, in addition to serving the role of being a software intermediary, between computers and/or servers, and/or between entities and other third parties, API's may define the technical requirements/specification, establish the rules and protocols, and even the acceptable formatting via e.g. JSON, SOAP, REST and XML data exchanges, and are also important in setting the standards and the integration and interactions between internal Microservices as well. These API's enable a software developer to e.g. establish the interactivity between their Microservices, via e.g. get, delete, post and put demands and thus control the bi-directional data flows. Of ever increasing importance is the overall management of the API's and especially, as to the aggregator roles, with API Array/Gateway functionality as in 201. Used, optimally as disclosed herein, API's as part of an overall strategy and the framework disclosed herein and shown in FIGS. 1,2 can build value, ensure success and optimize efficiencies and achieve the requisite standards and consistency. With an ever changing multiplicity of third party partners, ever changing technical standards, devices etc., and now the increasing importance of and implications from AI embodiments and those unique interfacing needs, as well as the need to interact/integrate with cloud based, hybrid cloud based, and/or multi-cloud solutions/options, along with the scalability challenges as further addressed in respect to FIG. 3, API's deliver value, flexibility and performance but they must be managed, updated and maintained. And with their importance and considering API's may also serve as the gateways into/with the core applications/services, security of the API's must be accommodated and included too, including establishing the requisite security polices/standards, access controls, authorizations, and including conducting appropriate testing and verification against both expected and unexpected vulnerabilities. In fact, API's facilitate, inherent system/solution A/B testing and simulations, which are all options and included in the disclosures herein. Further, the various types of API's can be selected and utilized, based upon the particular requirements e.g. database, web and/or database API's and all optional elements/choices. Web API's, (usually relying on HTTP), enable machine readable data transfers, database API's provide interactions back and forth, with the respective database options and memory storage embodiments while operating system API's control the interactions with the operating systems themselves. Further data exchange options, and to include internal data communications between e.g. Microservices, meeting machine intelligence needs and between e.g. databases, and/or the data warehouses, data lakes, cloud based computing and/or other data storage options, include utilizing e.g. message brokers and other streaming data platforms and options; the choice of which are dependent on scale, and the requirements; which a POSA would understand, and while exploiting 'tech stack awareness' and 'tech stack integrations', when appropriate. Both data warehouse and data lakes are options herein, yet they meet different needs from one another. The data warehouse is designed and optimized to analyze relational data generally from transactions and the schema and data structures are established/set in advance to align with the expected/desired queries and targeted to provide uniformity, consistency and structure. However the data lakes provides the ability to store both non-relational and relational data, from an almost unlimited number of inputs and sources, and in which it can be unstructured, unlike data stored in the data warehouse. Thus, no advance design and/or rigid schema is required for data lake storage. Further, data lakes, by their nature are capable of storing vast quantities of data/information, albeit not that the type of data that is intended for rapid, real time access.

In the upper left of FIG. 2, the 208 OLAP based machine intelligence, interfaces with the optional data warehouse 206 and the optional data lake 207 and with the sphere itself, utilizing/operating distributed and scalable computing resources and multiple microservices. While the depicted embodiment reflects the exemplary data store and data warehouse as being separate from one another, and implies physical separation/distribution as well and while that may be a common embodiment, those terms are themselves merely exemplary, because databases can be utilized in a wide variety of ways, that a POSA would understand, while ensuring the single truth requirement is adhered to. This is merely one of many data storage embodiments as shown and any combination of these embodiments and all of the database/storage approaches that a POSA would understand and/or select from are included in this disclosure and this also applies to the OLAP analysis and activity itself too. Further, A/B based simulations and network load testing and continual learning/improvements are an integral aspect of the application of machine intelligence here toward achieving the objectives of continual network improvements, performance optimizations, fraud detection/prevention and network error and partition avoidance and recovery. Each embodiment, will have its own unique and critical performance factors/aspects, which must be continually tested, and optimized to include e.g. the selection and assignment of the drivers for orders, optimally routing them, determining which restaurants and/or menus to be presented in response to orders, and as disclosed herein, the intelligent assessments and application of 'tech stack awareness' to these and other such factors is disclosed and included. Thus not only may OLAP type analysis, similar machine intelligence, data science and/or rules/report development occur independently and in a distributed way, and included virtually by/via e.g. virtual servers and/or distributed and scalable servers, server clustering options and/or similar computing centers/options but the OLAP type and OLTP type testing and machine intelligence can optionally be concurrently combined together, as a POSA would understand to do, as guided by the disclosures herein into a new ordered combination of these closely related/different data science based elements and thus improving on the separate applications and embodiments standing alone. These new ordered combinations are clearly and powerful improvements on the prior, stand alone solutions.

Below the sphere. 201, are related spheres, 211, 212, and 213, representing an exemplary embodiment of food/drink ordering within the larger transaction based hospitality market and their respective elements of restaurants, delivery persons and ordering consumers. Each must register, sign up and provide their data and inputs into the network, in order to participate and this is accomplished through one or more of the API interfaces. 209 and then select to be 'operationally stateful' at and for the appropriate time periods though links, 210 and then to become 'operationally stateless', also via links, 210, or via mobile apps, web pages and/or other such options, either at the end of the selected duration of a time period, automatically, at the completion of a transaction and/or via other logical points in time, as a POSA would understand. In effect, and actuality, each 'plug in', and or 'plug out' of the network, as appropriate and desired, and as is depicted/represented e.g. via the icons, showing a 'power plug in point', to a stopwatch, representing time/plugging in. And as is discussed above, while the term API is used here, these set up and/or registration steps/interfaces/inputs can also occur via a variety of options, e.g. via mobile apps, inclusive of all their web app and other variants, via browser based interfaces, as for either consumers and/or drivers, and the restaurants will have their own interfaces, generally using the more standard API interfaces, which are essential for menu updates and to maintain data consistency. The restaurants too, may change their state to/from 'operationally stateful' and/or 'operationally stateless' dependent on date/time, e.g. whether they are open/closed for service and/or optionally if they are open/closed to accept deliveries and in a wide variety of options/ways, such as selecting some or all of their orders to be distributed or not, via the aggregators. Clearly, in this embodiment, inputting and maintaining the complex menu data sets/relationships defining the e.g. the detailed categories, items, modifiers, sub modifiers, their content to include e.g. recipe data and preparation times, times when available. (e.g. certain menu items are only available for selected time periods), and/or up to quantity limits, prices to include tax information (which may or may not be unique/different—dependent on their geographic location) and all their interrelationships, is very complex, time consuming without an API and standards and of utmost importance, since this defines the superset of what is available, and when. Further, as to items/choices, that may be limited, when a quantity is reached, that item is then made to be unavailable. Further still, some items might be only available for pick up, and not for delivery due to their characteristics. This information can be input, on behalf of the restaurant via e.g. their POS systems, a multiplicity of third party software solutions/services, for maintaining menu consistency or other options, as known to a POSA yet each complying with the API requirements of the aggregator, independent of the interface and/or upload and data exchange options. Further, menu variants and changes can and usually do change, in real time, and this too may be accomplished via one of these options. This can and usually does occur automatically. Further, this can be accomplished, one at a time, or across multiple linked restaurants when e.g. a chain and/or an associated group of restaurants, has common menus and a change, e.g. a price change to an item/choice is made that reflects all of their associated restaurants. Another disclosed option herein, facilitated and enhanced via the framework and flexibility of its architecture is 'dynamic pricing', i.e. the ability to change prices, in real time, to reflect a wide variety of factors, including the time factors as emphasized herein e.g. date/time sensitive parameters and thus to optimize profitability. This 'dynamic pricing' is not limited to the prices of the items themselves, rather it can also be applied to delivery fees, which can also serve as a 'throttling' mechanism, to address capacity constraints and such dynamic pricing is available at the aggregator and/or chain, and or individual restaurants level. Yet another option and channel, available from the disclosed, adaptable framework, is the ability to accept orders from simulated restaurants, within a metaverse, and other similar emerging channels, in the ever changing digital age of the $21^{st}$ Century. Additionally, since the POS systems, which are elements of the overall restaurant 'tech stack' and which are third parties integrated with aggregators too, and which clearly a POSA would know, provide parallel and concurrent functionality within the restaurants for walk up, drive thru and/or sit down, table service customers, and to include via wireless handheld equipped staff and this ongoing, real time activity is optionally included as part of the options herein as are smart phone guest 'on premise' ordering and all of which may also be linked to and synchronized with delivery and/or take out transactions in respect to capacity limits, and thus varying delivery preparatory times, but even availability too, if an item or items/choices from the menu themselves become limited or unavailable, and as above, dynamic pricing could be applied here too.

The 'tech stack' information, some of it as described above is primarily input and stored, in advance of transactions/orders, via the links, in 209, although it may also be continuously updated, in part and in real time as a result of transactions and/or other third party interactions. Further, any of the elements can update/change their information, at any time, via the multiplicity of API links. The API's, in all their forms/variants serve as the rules defining the overall framework. As is explained above, as to the various tech stacks, the information/data that can be input, and/or chosen to not be input is selectable, optional and changes over time. Further, this data is not limited to choices, made by the participant elements but as is also obtained from other options, and continually updated, to reflect prior transactions and/or data from either the OLTP in 115 or OLAP processing analysis, in 208. Session Affinity is maintained.

The options at bottom, 214-220 represent additional options and embodiments, that a POSA would understand. Restaurants options as in 214 can offer relationships between related restaurants, e.g. as part of chains, and or associated restaurants, wherein for example, if an order capacity is reached at one, an order could be distributed to another related and/or associated restaurant. Additionally, virtual restaurant options exist, and are included in the disclosures/options herein, where for example a restaurant doesn't offer sales on site, and is rather limited to delivery, take out/pick up or both, and/or including at places ordered meals, in specific locations may be picked up by the guests, e.g. in physical lockers and/or via various similar locations/devices/embodiments from which a consumer can know and access, and usually including a requirement to include identifying information and/or payments then to gain access to their remotely initiated orders. Further as is discussed above, restaurant chains and/or groups of associated restaurants may be their own 'order aggregators', and ordering options can be available, from even individual restaurants entirely independent of any chain and/or aggregator, and/or may limit their orders with aggregators to particular time periods and which they can change the 'operational state' and/or preferences/choices of as to their preferences/needs vary. However an 'order aggregator' as defined herein and as a POSA would know, includes the ability to aggregate two or more locations and/or virtual locations, and a single restaurant and or a single hotel/venue is merely an 'order provider'. Consumer options in 215 can also include for example, ordering from alternative locations, and/or group/catering orders, representing more than a single consumer. Additional, order aggregator options, 216, include its own ability to update its own tech stack, representing changes, that are relevant to its performance and/or availability and/or rule changes. As previously discussed, as AI options continue to increase and expand, the AI choices/options themselves 217, may, in effect 'plug in', and or 'plug out' of the network, if, for example, they are unavailable due to a service/repair situation and/or e.g. if their batteries need to be recharged. As is also discussed previously, the hotel/rentals, (including e.g. the rental by individuals of homes, apartments and other such non-traditional hotel rooms) and restaurant reservations and event venue embodiments, 218, 219, and 220, represent their own respective types of orders, e.g. as in reservations and/or event tickets and their consumers and/or participating locations/providers must 'register' and/or 'plug in' and/or 'plug out' of their own respective networks and linked with aggregators in/for their own respective embodiments, e.g. travel aggregator sites/services that provide collective services across chains and/or geographic areas/locations, but would normally not have delivery drivers, yet in some instances such options will exist and be part of the disclosures herein. Their data, as in e.g. venues, includes very precise information in which an order is restricted to a particular venue on a particular date at a particular time, in a particular section and even to a particular seat or seats, and as in group orders and as such precision and order equilibrium must be maintained to avoid duplicate seats being sold/provided to multiple customers for a resource limited to only one. Further as is discussed above, food ordering embodiments can be combined, with restaurant and/or hotel reservations in a multiplicity of options/ways, since food/drink sales are often associated/available from each and embodiments can include e.g. particular advance food/drink orders associated with reservations.

It has long been recognized and acknowledged that defining a problem in a new and revelatory way, as is done herein is directly applicable to patentability, novelty and non conventionality and the 4D Spherical Scalability approach not only meets, but exceeds all of these factors. The context of viewing and applying the scaling parameters, choices, and rules, impacting scalability in the spherical context, as opposed to prior linear based approaches, provides the advantages that the spheres can conceptually increase/decrease in size, move, and/or spin/rotate and with variable speeds in doing so as well and consequently, this approach is ideal for visualizing, understanding and then optimizing and exploiting the improved technical approaches disclosed herein. FIG. 3 provide another flow chart integrated to/with FIGS. 1 and 2, and depicts the intelligent and continual, 4D Spherical Scaling 107 in the center of the top sphere and as is previously shown in FIG. 1, 107 and also, alternatively depicted in 109, as the 'Temporal Order Intranet Network', That, 109 is reflecting the actual computing resources used at any given time, dependent on the load and needs of the network and occurring through a variety of distributed computing and mostly cloud based solutions for order aggregators, and/or in some embodiments, even for order providers. As used here and throughout the figures and disclosures herein, the exemplary 'snapshot in time', is Mar. 18, 2023 at 11:30:01:01 and as is shown, in 103 at the bottom of FIG. 3 and at the top of FIG. 1. Inputs 105 and 108 at bottom reflect load data/information from FIGS. 1, and 108 is derived from FIGS. 2 and 105/108 are integrated together then, and then proceed to have the steps/options and intelligence/rules of 308, 309, 310,311 applied, and including the time based options as shown and further described below together, in the integrated sense, yielding 306, which reflects the integration of rules and with the optimal choices from the prior standard types of two dimensional scaling, horizontal and vertical and integrated appropriately into the improved 4D Spherical Sense, 302, which then yields the 107 4D scaling, which then is also reflected into the 107 of FIG. 1.

Prior, traditional scaling options, have been mostly linear and two dimensional, e.g. horizontal (out/in) and vertical. (up/down) on an e.g. X and/or Y axis and usually in a linear sense of scaling up, e.g. increasing computing capacity e.g. on site or off site via services to do so or scaling out, by distributing capacity to/with other distributed computing locations, centers services and/or virtual datacenters, including a wide variety of options/choices/approaches. These type of options are shown e.g. on the X 304 and Y 303 axis in FIG. 3. Uniquely herein and as shown in FIG. 3—the 'S' combined, spherical based factors of this disclosure adds both a third and fourth dimension to the intelligent network scaling, by combining the Z axis inputs as shown in 305, and reflecting the ordered combination of the elements and factors shown in FIG. 3 and discussed in detail below, 306 is the combined and integrated two additional factors, and as is reflected in S1,S2 and Sx, reflecting spherical, non linear combinations (and yielding the 302 'S' based combined factors), scaling inputs/actions into 307 and which also reflect both the third and fourth elements of 4D spherical scaling combined, and depicted as such spherically here in FIG. 3 and synchronously and seamlessly reflecting the multiplicity of factors, options, elements and rules applied, including, intelligence and e.g. micro services based options/alternative and their associated elasticity, and 'intrascalable microservices', as shown e.g. 105, 108 inputs and 306, 307, 309, 310, and 311 in and the seamless integrations of some or all of the e.g. 'tech stack data', 'tech stack awareness' and/or 'operational states' information and their volumes and reflecting the ever changing time based dates/times and varying information. This achieves an overall 4D spherical based balancing of resources which may include autoscaling too, in accordance with established rules (e.g. reflecting preset CPU utilization rates, min/max concurrent requests, and/or limits relative to performance utilization), to ensure/provide sufficient resources at any given point in time to maintain performance as to the volumes/load, and also includes intelligent throttling as well when/if needed, to maintain availability, even at peak loads but also to rapidly scale down as needs change, to preserve resources and avoid costs to the extent possible, when they are not needed. However, while the new 4D spherical scaling approach disclosed herein is the new framework, and visualization which is an improvement on the prior, limited and mostly linear approaches, some partial linear aspects may still be included while still operating within the overall, new 4D spherical based scaling framework disclosed herein. Thus a wide multiplicity, of variants, hybrids and/or combinations are possible and from which a POSA may select, dependent on the embodiment. This framework and the flows herein, followed by the descriptions below guide a POSA in architecting the 4D spherical scaling approach. Both stateless and stateful servers, may be employed, but with a POSA knowing that stateless servers usually provide optimized performance. However a POSA would also know that session state can be externalized and this option/approach is also disclosed herein and along with the requisite load balancing and load balancers disclosed herein and as shown e.g. in 307 are made as options of the disclosed frameworks. Messaging between servers and/or microservices can be either synchronous, asynchronous or combinations of both, here and as in/to/with other aspects/elements of the overall framework as well. Further, just as AI is emerging more and more in the other elements and roles, within the disclosed network, it is also applicable here too and by applying the learning and machine intelligence results and benefits from 115 and 208. Further details explaining the 4D spherical scaling and the exploitation of the advantages from a microservices based approach follows below.

4D Spherical scaling as provided herein provides the capacity to meet planned, persistent needs/loads increases in network workload and unplanned spikes in loads by accessing and/or providing additional resources to meet this demand, whereas elastic scaling, mostly involves the dynamic use and allocation of computing and memory resources, and especially cache memory resources to meets sudden and dynamic demand increases. Elastic scaling is faster, more flexible and can more easily meet unplanned and unanticipated load increases, and also reverse equally rapidly to minimize the use of costly resources as soon as they are no longer needed. Clearly a combination of both is usually required and such a combination is included herein.

Also, included in the 4D Spherical Scaling approach is server and virtual server elasticity, and this provides an alternative ability to rapidly address time sensitive scaling needs. Microservices and Hybrid Microservices options are also important and are included as options too and either approach is very useful for meeting scaling needs as well. A Hybrid Microservices architecture is also an option and which may include some monolithic parts/elements and others may include embodiments with the application developed, supported and deployed as microservices. These may include unique, and usually cloud-hosted sub applications— each with a specific task/function—and which may include their own datastores and that are designed to work together with other such services/functions, and which assist with the 4D Spherical Scaling approach, by distributing application load balancing of the application/services and providing consistency and reliability while optionally utilizing and employing replicable, elastic services. This may and usually does include the ability for the 'intra-scalable microservices' as defined herein and shown, herein, as in 310 and as supported by a range of caching options e.g. 312, 313, 314 and 315. Caching and especially with linked microservices is another advantage from the 4D Spherical scaling disclosed herein in FIG. 3. This is a technique to improve scalability and performance, by seeking to maintain the most often used data as close as possible to its execution on the relevant servers and/or virtual servers supporting the application, This may entail, making multiple temporary copies of data and distributing it appropriately and optimally, into storage that has extremely fast access and performance, so that this approach can deliver/yield speed and performance. It yields optimal performance and results, when the client, instances and/or service, need to repeatedly access the same data, and this is exceptionally true, when, for instance the Temporal Ordering Intranet Network' 123 is operational/active and state must be maintained and to yield and maintain 'order equilibrium', 116. Both public based storage and private are included, with private, e.g. via an in-memory storage and when data is stored very locally and allowing direct access from the related application and/or microservice and to include multiple instances of each as appropriate and as a POSA would understand and shared cache options, e.g. stored at/by additional locations and/or services, including hosted/cloud based options and inclusive of multiple processes are disclosed and all such options may involve client side or server side functionality or both and while ensuring that cache consistency is maintained. Performance trade offs, are integral to the Intelligent 4D Spherical scaling approaches herein, (as shown in FIG. 3) and involve considering the advantages and disadvantages of each, e.g. shared caching is optimal for scaling and can be implemented by many servers and/or virtual servers, and even clusters of each, yet this caching is slower than the localized, private type caching, and as such a mixture of each is often required and with the localized caching focused on the most time sensitive data and requirements. Further as is disclosed herein, as part of the 4D spherical scaling approach, as in 307—Microservices themselves can act and scale independent of one another, and thus yield 'intra-scalable' performance benefits and thus if an enormous peak load occurs, in a particular area of the overall service/application e.g. of the Order Aggregator, only those microservices directly associated with that particular load need to be scaled, and this is where elasticity and local caching deliver the best results. Optimal results from caching in decreasing latency is achieved by e.g. message queuing with end to end reliability and/or selecting the right data and/or type of data to cache, when to cache it, while ensuring cache consistency, via e.g. synchronizations and how to and where to cache it and this is one of the advantages from the adaptable framework and consideration of the multi-faceted time inputs, from 301 4D spherical scaling herein, and as is shown, e.g. in 307 and 310. Data can optionally be added to the appropriate cache, when it first appears and/or is used, or exploiting the 4D Spherical scaling and optionally 'tech stack awareness' and application of other machine intelligence and/or rules, disclosed herein as a POSA would understand them, data can be moved to and populated at, specific locations, and thus be primed to deliver optimal performance, via the measured application of rules, machine intelligence and the exploitation of all the time/scheduling and predictive aspects, derived from the multiplicity of time inputs and real time data analysis and processing as disclosed herein. Considerations for warm up and/or start up time, relative to both scaling and elasticity is also of paramount importance, and is included in the considerations herein, since, dependent on the selected architecture and/or framework, failing to account for these factors can lead to a degradation in performance. Thus the overall systemic framework disclosed herein and as depicted initially in FIG. 1, while being integrated with the teachings in/from FIG. 3 and then supplemented and further explained in the additional figures and teachings herein, and by exploiting tech stack awareness and/or 4D Spherical scaling as disclosed herein, yield significant improvements over prior solutions. The solutions herein, also may optionally employ e.g. read replicas, and/or multiple instances to further address peak loads and/or offload non transaction critical tasks, e.g. analytics traffic and/or to create multiple instances, when, how and where available and/or needed to optimize overall network performance and scalability.

FIG. 4 further depicts the 'order equilibrium' concept 116 and further depicts and explains the 'consumer tech stack' 114. As shown within the house, the consumer, while not yet fully appreciating it, has a vast array and superset of technical options, interfaces, applications, devices, passwords, social media site linkages, identifiers, inclusive of cell and/or phone numbers, business phone numbers, work and personal emails, and often multiple of each, and PAN, LAN and WAN wireless networks and then, changing as the consumer travels and/or moves from one geographic location or another, e.g. into one's automobile, other modes of transportation, and/or is in other/different locations, than one's home e.g. hotels, venues, etc., and as for restaurant applications, with the appropriate geolocation functionality of the restaurant/hotel/venue available and tracking of same authorized by the consumer, one's physical location can recognized/determined and then be utilized in a wide variety of applications/embodiments, e.g. recognizing proximity to the destination address and e.g. in the restaurant embodiment, enabling detection of same, and automatically placing one, on a waitlist, to include e.g. in Casinos and/or poker rooms and/or registering one to have arrived and thus to initiate preparation and/or packaging and/or finalization of meals/drinks etc. Clearly these embodiments provide numerous advantages over prior solutions and as part of multiple ordered combinations, herein. Again consumers, that might frequent casinos, with poker rooms and/or stand alone poker rooms, and which have associated waitlist functionality and/or 'tournament registration' sign up functionality may exploit the disclosures herein for wireless/web sign ins and sign up and which are somewhat equivalent to 'signing in' and/or 'signing out' as is discussed above, and thus can also utilize this functionality and automatically enter the consumers onto waitlists and/or into poker tournaments and this functionality—combined with one or more other elements described herein and/or other disclosed options, including AI options and/or other embodiments as an ordered combination are additional embodiments included in the disclosures herein.

To depict the 'order equilibrium' option 407 from 116 in FIG. 1, in greater detail and further illuminate the technical aspects/components of it, the consumer e.g. conceives/thinks of their desire to 'order their favorite' in 413, which includes a hamburger meal, and which is shown, via the icon, within the cloud, 413 and then reflects that at the various points/instances throughout the exemplary elements within FIG. 4. The 'ordering' of the 'favorites meal' is initiated with a single touch of 'order my favorites' onto the touchscreen of the exemplary smart phone, 412 equipped with a touch sensitive screen, and with the exemplary capacitive touch technology, yet this is merely one embodiment, and a POSA would know that touchscreen technology is available in a variety of options all of which are included. Further, while the single 'touch' is depicted here to initiate the order of one 'favorites', (which thus innately has been preselected/stored), other technical options for order initiation exist too, e.g. via voice ordering through voice recognition and/or other biological, wearables based, smart watch and/or other technical options, and all are included as optional embodiments herein.

The example of 'order my favorite' is important here, because in order for that to be meaningful and recognized here and throughout the network, 'what' that 'favorite' was and is and for 'whom' and how to pay for it may be and usually is part of 'tech stack awareness' and 'tech stack integration' and from advanced/prior registrations and/or transactions, that 'single touch' and/or 'recognized voice of 'order my favorite' must be recognized, meaningfully known and maintained, throughout the network and at all times through order completions and through/via all the digital channels, protocols and options/elements e.g. as in the 5G transmissions as shown from 412 to 401.

Further and importantly for this embodiment and the 'order equilibrium' concept, that 'single touch' and/or 'single voice order', must be correlated to and then interpreted by the software/hardware/firmware combination on/from the exemplary smart phone 412. And this correlation and presentation on the display, to reflect and enable this 'single touch' transaction, must occur, prior to that 'touch' occurring, and clearly the user interface that depicts the choice/button on the smart phone screen, must then be aware of what the 'order my favorite' touch option means/is and from whom. Thus the software/firmware/hardware in combination, must recognize and then equate that single touch, with the detailed order information, which may be part of the 'tech stack' of the consumer and may utilized 'tech stack awareness' at least part of the subset of frequency/preferences data stored for this particular consumer. And this may either be stored in advance on the handheld, via a mobile application, or and most commonly wirelessly sent down to it, once the consumer indicates that they are ready to place a new order, but these and all other combinations/embodiments, that a POSA would know are included. With todays' 5G communication speeds, in most instances, the transmission and/or downloading of the available user interface options and the integration with the mobile OS, firmware and display and touch sensing elements occurs almost instantly in accordance with the consumers ability to discern and in effect 'appears' to have been 'stored' previously, when in many embodiments it is not, yet again, which of these options/embodiments and approaches is employed does not impact the scope herein. All are included as options.

Once the initiating, 'order my favorites' touch. 412 and by consumer 401 here and 111 in FIG. 1 occurs, this triggers a flow chart sequence of actions/events, as a POSA would understand and (as shown here e.g. in FIG. 4), and earlier in FIG. 1 as part of the flows and the 'temporal order intranet network' of 123 in FIG. 1 resulting from the consumers 'operational state' changing to 'stateful' and then, from a timeline perspective, as is shown in e.g. FIG. 5.

That initiating analog 'touch' 412, and/or analog voice command is then converted into digital data representing that consumers favorites' data, as is shown by the common icon used, throughout FIG. 4 and all ordering and personal information, which is prestored/and known, by the 'aggregator' and/or 'provider' and/or 'restaurant', via e.g. 'tech stack awareness' and via e.g. 'tech stack integration' and sent as in all digital transmissions, either as a wired or wireless transmission. From this initiating action, the precise preferences of the 'favorites' must be maintained consistently; thus 'order equilibrium' throughout the connected network and all files/databases/communications, to include protocol and format conversions, as required, to include e.g. even within the kitchens and prep stations of the restaurants and out/to the delivery persons, must be maintained in order to achieve the required 'order equilibrium', and resulting, in, the actual delivery back to the consumer, via the delivery person, 405 and/or delivery robot, 421. As with FIGS. 1, and 2 discussed above, all of the options, and varying embodiments, as shown at bottom, here, via 414-420 are also applicable to this further detail of the earlier options/embodiments.

FIG. 5 depicts an exemplary order timeline and sequence of events, for an order as in 111 from FIGS. 1 and 412 from FIG. 4. Importantly here and providing more detail and explanations relative to the 'automatic bi-directional communications channel switching, functional, this example shows how an order can be initiated via one channel, e.g. an email and/or app based order, mode 1 at minute 01 but the channel switched to an alternative channel, e.g. text/chat, mode 2 automatically at minute 05 and at various points when the order is ongoing, e.g. at Minute 41 and all while optionally exploiting 'tech stack awareness' and 'tech stack integrations', and also enabling delivery drivers, (mostly enabled to only send digital chat/text messages) to engage directly with the ordering consumers, when/if necessary/appropriate. However the text/chat messaging and/or other channels, can be initiated and/or switched and back and forth, in either direction, in accordance with preferences, pre set rules and/or changing circumstances. And as is discussed above, with/from the ever growing capabilities, functionality and options from ongoing AI advancements, all or some of these steps/functions can occur from or by or with AI agents, AI chatbots and/or even AI enabled robots, when/if appropriate. This powerful functionality, and as part of a multiplicity of options and alternative ordered combinations, as a POSA would understand and be able to combine for unique requirements enhances the overall reliability and consistency of the prior networks and offers many technical improvements.

While multiple exemplary embodiments have been illustrated and described in detail herein, the flow charts/sequencing in FIGS. 1-5, their descriptions above and their interrelationships teach a POSA how to architect, and/or code and/or design the adaptable interconnected network, frameworks and other software and database features disclosed herein. The POSA will also recognize a multiplicity of alternative designs and embodiments related to not only the hospitality and/or gaming/poker exemplary embodiments. (disclosed herein), but also as to many more in other related, time sensitive, transactional based applications and all of which fall within the spirit of practicing the disclosed techniques.

What is claimed is:

1. An Adaptable Computing Network Framework With Real Time, Intelligent, 4D Spherical Scalability capability for hospitality market applications, comprising:

a.) A plurality of distributed and networked computer servers and/or server clusters with web server software and that are fully integrated with hospitality aggregator software applications that are in data communication with said servers and/or server clusters;

b.) A central data platform, integrated with said network of computer servers and/or server clusters;

c.) An API Array/Gateway, integrated with said servers, said hospitality aggregator software applications and said central data platform, and providing the data links and communication architecture to enable the full, real time, concurrent and seamless integration and networking between an order aggregator, and a multiplicity of order providers, and ordering consumers;

d.) Web interfaces to/with and/or between networked elements to access external information and integrate it within the network;

e.) An Intelligent 4D Spherical Scaling framework architecture that accommodates time sensitive and changing system loads to optimize performance and minimize network latency;

f.) Intra-scalable Microservices functionality supporting the said Intelligent 4D Spherical Scalability architecture;

g.) Said hospitality aggregator software application integrated with the said central data platform and which applies tech stack awareness to optimize security and efficiency across the network;

h.) wherein the said web servers and/or web clusters are integrated via the said adaptable and 4D Scalable computing network framework into an ordered combination with the said central data platform, the said API Array/Gateway, and the said web/internet interfaces, while leveraging the said Intelligent 4D Spherical scaling architecture, to enable seamless and reliable operations between the order aggregators, order providers, and ordering consumer to yield a synchronized network enabled to accept, process and complete, a large multiplicity of concurrent orders.

2. The network of claim 1, which is further integrated with one or more existing monolithic hospitality applications to yield a hybrid network.

3. The network of claim 1, further including 'AI Orders/integrations'.

4. The network of claim 1 in which the API includes schema enforcements designed to improve fault tolerance and minimize data latency.

5. The network of claim 1 further including combined and concurrent OLTP/OLAP Machine Intelligence and leveraging data warehouse and/or data lake functionality for analysis and to establish rules to optimize network performance and reliability.

6. The network of claim 1 in which one or more of the wireless handheld computers, includes two or more, integral mobile apps that are integrated together.

7. The network of claim 1, in which GPS locations and/or personal area network communications between connected devices are leveraged to verify and confirm identities as part of tech stack awareness.

8. The network of claim 1, in which GPS locations and/or communications between an ordering consumer and order deliverer are leveraged to verify and confirm identities as part of tech stack awareness.

9. The network of claim 1, in which consumer tech stack information is leveraged to yield deep frequency/rewards integrations to provide additional benefits to both the consumer and the aggregator and/or suppliers.

10. The network of claim 1 in which the intra-scaling of the Microservices, is accomplished in part via elastic caching and using at least one of application, distributed, web and/or database caching techniques to optimize performance while maintaining cache coherency.

11. The network of claim 1, in which the 4D spherical scaling yields the 'S' combined parameters by integrating the X, Y,Z axis factors and which reflect the ordered combination of the parameters and factors as shown in FIG. 3.

12. An Adaptable, Real Time, Intelligent 4D Spherical Scaling Computing Network Framework for hospitality market applications, comprising:

a.) Two or more distributed and networked computer servers with web server software and that are fully integrated with hospitality aggregator software applications executing from and/or with said servers;

b.) A central data platform, integrated with said network of computer servers;

c.) An API Array/Gateway, integrated with said servers, said hospitality aggregator software applications and said central data platform, and providing the data links, schema enforcement and communication architecture to enable the full, real time, concurrent and seamless integration and networking between an order aggregator, and a multiplicity of order providers, and ordering consumers and/or with other integrated third parties;

d.) Said API Array/Gateway, further enabled to determine and set the operational state and ensure order completions;

e.) Web interfaces to/with and/or between networked elements to access external information and integrate it within the network;

f.) Intra-scalable Microservices functionality;

g.) Said hospitality aggregator software application integrated with the said central data platform to apply tech stack awareness across the network;

h.) real time, wireless communications with one or more wireless handheld computers between the order aggregator and/or order provider and/or order deliver and ordering consumer;

i.) wherein the said web servers are integrated into an ordered combination via the said adaptable 4D Spherical Scaling computing network framework and the said central data platform.

13. The network of claim 12, further including 'AI Orders/integrations'.

14. The network of claim 12, in which one or more of the handhelds incudes its own AI functionality that is at least partially executable without the need for external communications, and that is customized for its user's unique needs and/or preferences.

15. The network of claim 12, in which a mobile application, includes integrated frequent customer functionality/rewards across a multiplicity of different frequency and/or reward programs.

16. The network of claim 12, further enabled to apply AI functionality to address order overflows and/or to stack/combine orders to reduce costs and increase efficiencies.

17. The network of claim 12, in which the API employs AI to intelligently interpret and understand non fixed format based data/communications and/or established rules/schema to minimize the requirement for such fixed formats, schemas and/or rules.

18. An adaptable and integrated and intelligent system including a computing framework with 4D spherical scalability for hospitality market applications, comprising:

a.) A multiplicity of distributed and networked computer servers with web server software that are fully integrated with hospitality aggregator software applications executing from and/or with said servers;

b.) A central database that is integrated with said system of computer servers;

c.) An API Array/Gateway, integrated with said servers, said hospitality aggregator software applications and said central database, and providing the data links, schema enforcement and communication architecture to enable the full, real time, concurrent and seamless integration and networking between an order aggregator, and a multiplicity of order providers, and/or ordering consumers;

d.) Web interfaces to/with and/or between system elements to access external information and integrate it within the network;

e.) Intra-scalable Microservices functionality with executable instructions supporting Intelligent 4D Spherical Scalability;

f.) Said hospitality aggregator software application integrated with the said central data platform to apply tech stack awareness and AI orders/integrations to optimize security, reliability, and efficiency across the system;

g.) real time, wireless communications between a multiplicity of wireless handheld computers used by ordering consumers and/or aggregators and/or order providers while employing bi-directional communications channel switching to improve communications and provide redundancy while minimizing and overcoming system problems, and/or partitions and/or delays;

h.) wherein the said web servers are integrated via the said adaptable computing system into an ordered combination with the said central data platform, the said API Array/Gateway, the said web/internet interfaces, the said multiplicity of wireless handheld computers, while leveraging the said Intelligent 4D Spherical scaling, to enable seamless and reliable operations between the order aggregators, order providers, and ordering consumers to yield a synchronized system enabled to complete, a large multiplicity of concurrent orders in real time.

19. The system of claim 18, in which one or more of the handhelds incudes its own AI functionality, that is at least partially executable without the need for external communications and that is customized for its user's unique needs and/or preferences.

20. The system of claim 18, in which a mobile application, includes integrated frequent customer functionality/rewards across a multiplicity of different frequency and/or reward programs.

21. The system of claim 18, in which GPS locations and/or MAC addresses and/or personal area network communications between connected devices are leveraged to verify and confirm identities as part of tech stack awareness.

22. The system of claim 18, in which moving/multiple GPS locations and communications between an ordering consumer and/or an order deliverer are leveraged to verify and confirm identities as part of tech stack awareness.

23. The network of claim 18 further including combined, and concurrent OLTP/OLAP Machine Intelligence and leveraging data warehouse and/or data lake functionality for analysis and/or to establish rules to optimize network performance and reliability.

24. The system of claim 18, in which the 4D spherical scaling yields the 'S' combined parameters by integrating the 'X, Y,Z' axis factors and which reflect the ordered combination of the parameters and factors as shown in FIG. 3.

25. The system of claim 18, in which the API employs AI to intelligently interpret and understand non fixed format-based data/communications and/or established rules/schema to minimize the requirement for such fixed formats, schemas and/or rules.

26. An adaptable, integrated, and intelligent system including a computing framework with executable instructions for scalability, and elasticity for hospitality market applications, comprising:

a.) Two or more distributed and networked computer servers and/or server clusters with web server software that are fully integrated with hospitality aggregator software applications executing from and/or with said servers;

b.) A central data platform, integrated with said system of computer servers;

c.) An API Array/Gateway, integrated with said servers, said hospitality aggregator software applications and said central data platform, and providing the data links and communication architecture to enable the full, real time, concurrent and seamless integration and networking between an order aggregator, and a multiplicity of order providers, ordering consumers and/or order deliverers;

d.) Web interfaces to/with and/or between system elements to access external information and integrate it within the network via leveraging tech stack awareness capabilities;

e.) Intra-scalable Microservices functionality supporting 4D Intelligent Spherical Scalability;

f.) Said hospitality aggregator software application integrated with the said central data platform to apply tech stack awareness to optimize security, reliability and efficiency across the system;

g.) real time, wireless communications between a multiplicity of wireless handheld computers used by ordering consumers and/or aggregators and/or order providers;

h.) wherein the said web servers are integrated via the said adaptable computing system into an ordered combination with the said central data platform, the said API Array/Gateway, the said web/internet interfaces, the said multiplicity of wireless handheld computers, while leveraging the said Intelligent scaling, to enable seamless and reliable operations between the order aggregators, order providers, ordering consumer and optionally the order deliverers to yield a synchronized system enabled to complete, a large multiplicity of concurrent orders.

27. The system of claim 26, which is further integrated with one or more existing monolithic hospitality applications to yield a hybrid system.

28. The system of claim 26, further including 'AI orders/integrations'.

29. The system of claim 26 further including combined and concurrent OLTP/OLAP Machine Intelligence and leveraging data warehouse and/or data lake functionality for analysis and to establish rules to optimize network performance and reliability.

30. The system of claim 26, in which tech stack awareness leverages multi-faceted data and parameters across two or more ordering segments.

* * * * *